(12) United States Patent
Kamatani et al.

(10) Patent No.: US 7,904,291 B2
(45) Date of Patent: Mar. 8, 2011

(54) COMMUNICATION SUPPORT APPARATUS AND COMPUTER PROGRAM PRODUCT FOR SUPPORTING COMMUNICATION BY PERFORMING TRANSLATION BETWEEN LANGUAGES

(75) Inventors: Satoshi Kamatani, Kanagawa (JP); Tetsuo Chino, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1400 days.

(21) Appl. No.: 11/370,105

(22) Filed: Mar. 8, 2006

(65) Prior Publication Data

US 2006/0293876 A1 Dec. 28, 2006

(30) Foreign Application Priority Data

Jun. 27, 2005 (JP) ................................ 2005-187375

(51) Int. Cl.
*G06F 17/28* (2006.01)
*G06F 17/27* (2006.01)

(52) U.S. Cl. ................................ 704/2; 704/9

(58) Field of Classification Search ........................ None
See application file for complete search history.

(56) References Cited

U.S. PATENT DOCUMENTS

| | | | | |
|---|---|---|---|---|
| 6,154,720 | A * | 11/2000 | Onishi et al. ........................ | 704/2 |
| 7,050,979 | B2 * | 5/2006 | Mizutani et al. ............... | 704/277 |
| 2003/0097250 | A1 | 5/2003 | Chino | |
| 2003/0174777 | A1 | 9/2003 | Itoh et al. | |
| 2003/0216912 | A1 | 11/2003 | Chino | |
| 2004/0046891 | A1 | 3/2004 | Mishima et al. | |
| 2004/0240551 | A1 | 12/2004 | Itoh et al. | |
| 2004/0243392 | A1 * | 12/2004 | Chino et al. ........................ | 704/7 |
| 2005/0053291 | A1 | 3/2005 | Mishima et al. | |
| 2005/0100095 | A1 | 5/2005 | Itoh et al. | |
| 2005/0157792 | A1 | 7/2005 | Baba et al. | |
| 2005/0267734 | A1 * | 12/2005 | Masuyama ........................ | 704/2 |
| 2006/0078206 | A1 | 4/2006 | Mishima et al. | |

FOREIGN PATENT DOCUMENTS

| | | |
|---|---|---|
| JP | 2927350 | 5/1999 |
| WO | WO 00/13102 A1 | 3/2000 |

OTHER PUBLICATIONS

Tekalp, "Digital Video Processing", Prentice Hall Signal Processing Series, pp. 72-151, (1995).

(Continued)

*Primary Examiner* — David R Hudspeth
*Assistant Examiner* — Samuel G Neway
(74) *Attorney, Agent, or Firm* — Finnegan, Henderson, Farabow, Garrett & Dunner, L.L.P.

(57) ABSTRACT

A communication supporting apparatus includes an input accepting unit that accepts a source language sentence to be translated input by a user; a paraphrase knowledge storing unit that stores paraphrase knowledge in which a source language interpretation which is an interpretation of the semantic content of the source language sentence is associated with a paraphrase interpretation having the same semantic content as the source language interpretation and a different expression form; a source language analyzing unit that analyzes the semantic content of the input source language sentence and outputs the source language interpretation; a paraphrasing unit that obtains the paraphrase interpretation associated with the output source language interpretation from the paraphrase knowledge storing unit, and paraphrases the input source language sentence in a source language paraphrase sentence based on the obtained paraphrase interpretation; and a translation unit that translates the output source language interpretation into a first target language sentence and translates the obtained paraphrase interpretation into a second target language sentence.

10 Claims, 24 Drawing Sheets

OTHER PUBLICATIONS

Mishima, et al., "Image Matching Method and Image Interpolation Method Using the Same", U.S. Appl. No. 11/355,144, filed Feb. 16, 2006.

Ohwaki, et al., "Method, Apparatus and Computer Program Product for Generating Interpolation Frame", U.S. Appl. No. 11/368,440, filed Mar. 7, 2006.

U.S. Appl. No. 11/368,406, to Chino et al., filed Mar. 7, 2006, entitled "Apparatus, Method, and Computer Program Product for Supporting Communication Through Translation Between Languages".

Notice of Rejection issued by the Japanese Patent Office on Sep. 20, 2007, for Japanese Patent Application No. 2005-187375, and English-language translation thereof.

* cited by examiner

FIG.2

| | | |
|---|---|---|
| SOURCE LANGUAGE SENTENCE | 私が食べる | A201 |
| MORPHEME SEQUENCE | \<pron 私\>\<cm が\>\<v 食べる\> | A202 |
| WORD | 私 | A203 |
| WORD | が | A204 |
| WORD | 食べる | A205 |
| SYNTACTIC STRUCTURE | (s (np \<pron 私\>\<cm が\>) (vp \<v 食べる\>)) | A206 |
| SYNTACTIC STRUCTURE | (np \<pron 私\>\<cm が\>) | A207 |

FIG.3

201:
- (s (pp \<adv 急いで\> \<cp って\>) \<v 言う\>)  (203, 210)
- ⇒
- (s (pp (vp \<adv 急いで\> \<v 下さい\>) \<cp って\>) \<v 言う\>)  (204)
- PRIORITY 5  (121)

202:
- 《adv ?》\<cp って\>《v ?》《*》
- ⇒
- 《adv ?》\<v して\>\<cp と\>《v ?》《*》  (205, 206, 207)
- PRIORITY 2

| SOURCE LANGUAGE SENTENCE | 急いでって言ったじゃないか。 | A801 |
| --- | --- | --- |
| SOURCE LANGUAGE PARAPHRASE SENTENCE | 急いで下さいって言ったじゃないか。 | A802 |

FIG.10

| | | |
|---|---|---|
| 801 | 急いで下さいって言ったじゃないか。 | 803 |
| | <adv 急いで><v 下さい><cp って><v 言っ><aux た><cp じゃ><aux ない><fp か> | 804 |
| | (s (pp (vp <adv 急いで> <v 下さい>)<cp って>)(vp <v 言っ>(aux(aux (<aux た><cp じゃ><aux ない>)<fp か>))) | 805 |
| | 再入力フラグ=オン | 806 |
| 802 | 急いでって言ったじゃないか。 | |
| | <adv 急いで><cp って><v 言っ><aux た><cp じゃ><aux ない><fp か> | |
| | (s (pp (vp <adv 急いで> <cp って>)(vp <v 言っ>(aux(aux (<aux た><cp じゃ><aux ない>)<fp か>))) | |
| | 再入力フラグ=オフ | |
| | ⋮ | |

722 (shown at top right of table)

FIG.11

| | | |
|---|---|---|
| 901 | (s (pp <adv 急いで> <cp って>)(vp <v 言っ> (aux (aux(<aux た><cp じゃ>)<aux ない><fp か>))) | PRIORITY |
| | ⇒ | |
| | (s (pp (vp <adv 急いで> <v 下さい>)<cp って>)(vp <v 言っ>(aux(aux (<aux た><cp じゃ><aux ない><fp か>))) | 5 |
| 902 | (s (pp (vp 《adv ?》 <cp って>)(vp <v 言っ> (aux (aux(<aux た><cp じゃ>)<aux ない><fp か>))) | PRIORITY |
| | ⇒ | |
| | (s (pp (vp 《adv ?》 <v 下さい>)<cp って>)(vp <v 言っ> (aux (aux(<aux た><cp じゃ>)<aux ない><fp か>))) | 3 |
| 903 | <adv 急いで><cp って><v 言っ><aux た><cp じゃ><aux ない><fp か> | PRIORITY |
| | ⇒ | |
| | <adv 急いで><v 下さい>)<cp って><v 言っ><aux た><cp じゃ><aux ない><fp か>><aux ない><fp か> | 3 |
| 904 | 《adv ?》<cp って><v 言っ><aux た><cp じゃ><aux ない><fp か> | PRIORITY |
| | ⇒ | |
| | 《adv ?》<v 下さい><cp って><v 言っ><aux た><cp じゃ><aux ない><fp か>><aux ない><fp か> | 1 |

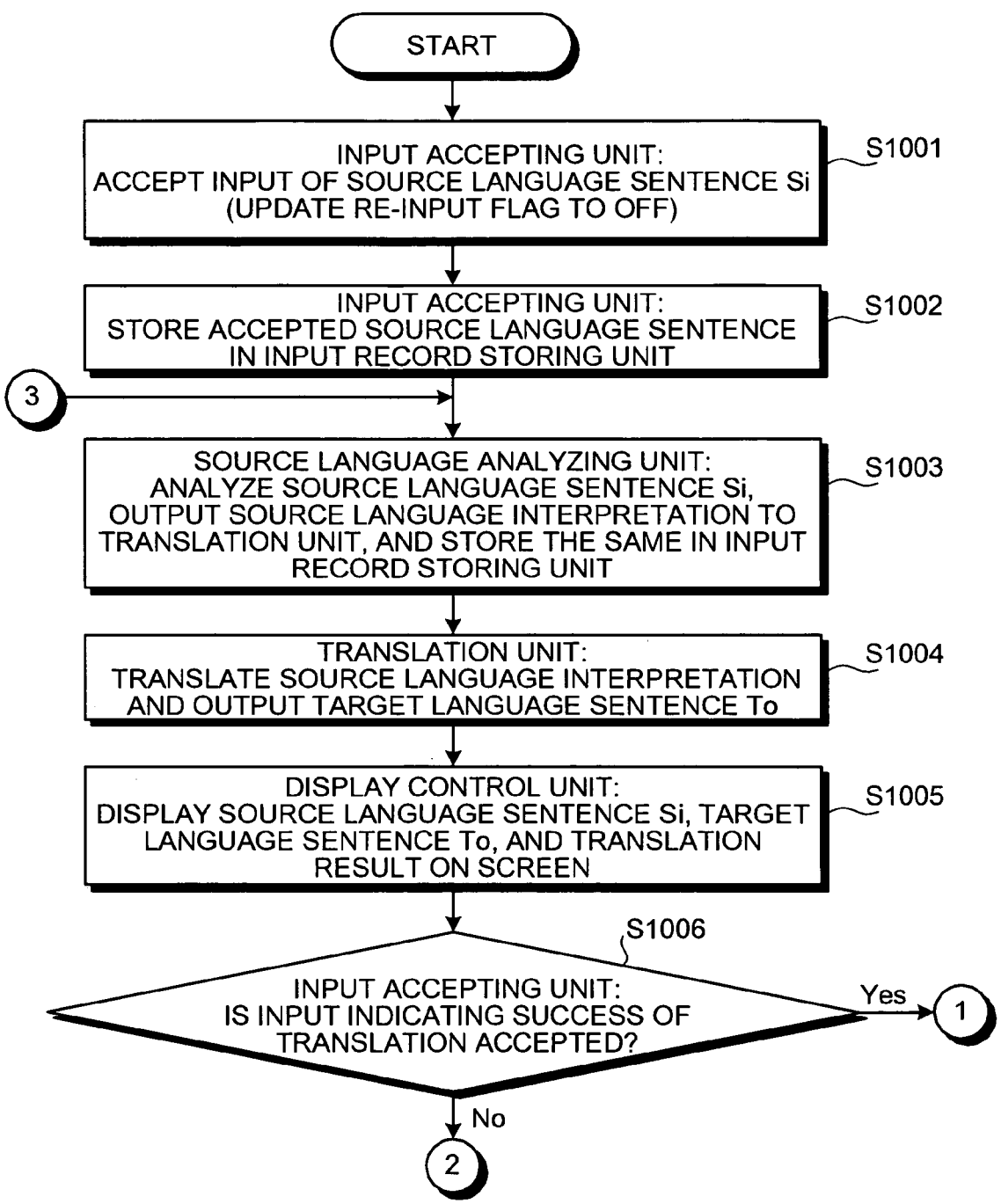

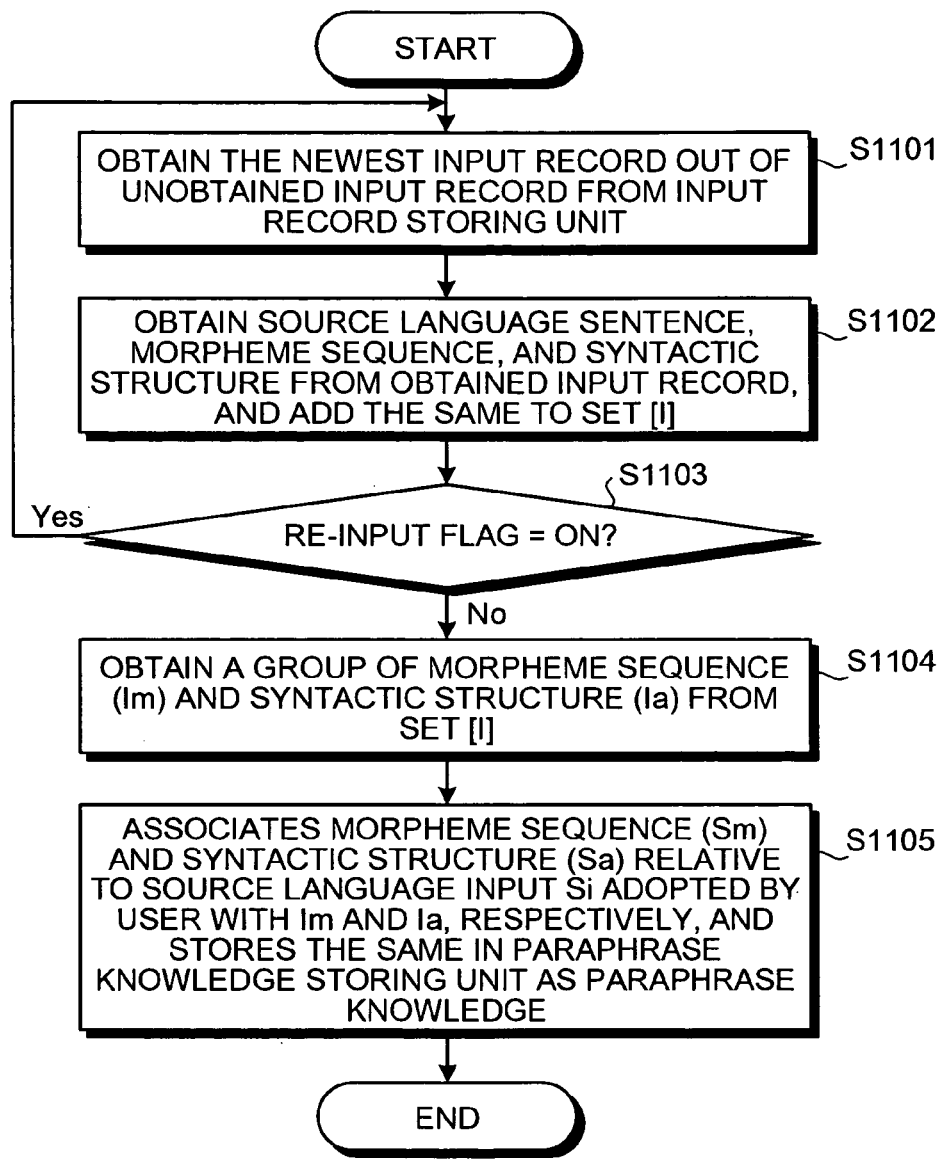

FIG.15

- 1301 — ●SOURCE LANGUAGE SENTENCE Si:
  「急いでって言ったじゃないか。」
- 1302 — ●MORPHEME SEQUENCE Sm:
  \<adv 急いで\>\<cp って\>\<v 言っ\>\<aux た\>\<cp じゃ\>\<aux ない\>\<fp か\>
- 1303 — ●SYNTACTIC STRUCTURE Sa:
  (s (pp \<adv 急いで\> \<cp って\>)(vp \<v 言っ\> (aux (aux(\<aux た\>\<cp じゃ\>)\<aux ない\>\<fp か\>)))
- 1304 — ●TARGET LANGUAGE SENTENCE To:
  Hurry.I said.
- 1305 — ●RESULT OF TRANSLATION PROCESS TR:
  部分訳になりました。
- 1306 — ●SOURCE LANGUAGE PARAPHRASE SENTENCE Sp:
- W1307 — 「急いでしてと言ったじゃないか。」
- 1307 — ～W1308
- 1307 — ●TARGET LANGUAGE SENTENCE Tor:
  I told you to hurry up.

FIG.16

- 1401 — ●SOURCE LANGUAGE SENTENCE Si:
  「急いで下さいって言ったじゃないか。」
- 1402 — ●MORPHEME SEQUENCE Sm:
  \<adv 急いで\>\<v 下さい\>\<cp って\>\<v 言っ\>\<aux た\>\<cp じゃ\>\<aux ない\>\<fp か\>
- 1403 — ●SYNTACTIC STRUCTURE Sa:
  (s (pp \<adv 急いで\>\<v 下さい\>)\<cp って\>)(vp \<v 言っ\> (aux (aux(\<aux た\>\<cp じゃ\>)\<aux ない\>\<fp か\>)))
- 1404 — ●TARGET LANGUAGE SENTENCE To:
  I told you to hurry up.
- 1405 — ●RESULT OF TRANSLATION PROCESS Tr:
  正常に翻訳されました。

FIG.17

| |
|---|
| 急いでって言ったじゃないか。 |
| <adv 急いで><cp って><v 言っ><aux た><cp じゃ><aux ない><fp か> |
| (s (pp (vp <adv 急いで> <cp って>)(vp <v 言っ>(aux(aux (<aux た><cp じゃ>)<aux ない>)<fp か>))) |
| 再入力フラグ=オフ |

FIG.18

| | | |
|---|---|---|
| 1601 | (s (pp \<adv 急いで\> \<cp って\>)(vp \<v 言っ\> (aux (aux(\<aux た\>\<cp じゃ\>)\<aux ない\>\<fp か\>))) | PRIORITY |
| | ⇒ | |
| | (s (pp (vp \<adv 急いで\> \<v 下さい\>)\<cp って\>)(vp \<v 言っ\>(aux(aux (\<aux た\>\<cp じゃ\>)\<aux ない\>\<fp か\>))) | 5 |
| 1602 | (s (pp (vp 《adv ?》 \<cp って\>)(vp \<v 言っ\> (aux (aux(\<aux た\>\<cp じゃ\>)\<aux ない\>\<fp か\>))) | PRIORITY |
| | ⇒ | |
| | (s (pp (vp 《adv ?》 \<v 下さい\>)\<cp って\>)(vp \<v 言っ\> (aux (aux(\<aux た\>\<cp じゃ\>)\<aux ない\>\<fp か\>))) | 3 |
| 1603 | (s (pp \<adv 急いで\> \<cp って\>)(vp 《v ?》 (aux (aux(\<aux た\>\<cp じゃ\>)\<aux ない\>\<fp か\>))) | PRIORITY |
| | ⇒ | |
| | (s (pp (vp \<adv 急いで\> \<v 下さい\>)\<cp って\>)(vp 《v ?》 (aux (aux(\<aux た\>\<cp じゃ\>)\<aux ない\>\<fp か\>))) | 3 |
| 1604 | (s (pp 《adv ?》 \<cp って\>)(vp 《v ?》 (aux (aux(\<aux た\>\<cp じゃ\>)\<aux ない\>\<fp か\>))) | PRIORITY |
| | ⇒ | |
| | (s (pp (vp 《adv ?》 \<v 下さい\>)\<cp って\>)(vp 《v ?》 (aux (aux(\<aux た\>\<cp じゃ\>)\<aux ない\>\<fp か\>))) | 3 |
| 1605 | \<adv 急いで\>\<cp って\>\<v 言っ\>\<aux た\>\<cp じゃ\>\<aux ない\>\<fp か\> | PRIORITY |
| | ⇒ | |
| | \<adv 急いで\>\<v 下さい\>\<cp って\>\<v 言っ\>\<aux た\>\<cp じゃ\>\<aux ない\>\<fp か\>\<aux ない\>\<fp か\> | 3 |
| 1606 | 《adv ?》\<cp って\>\<v 言っ\>\<aux た\>\<cp じゃ\>\<aux ない\>\<fp か\> | PRIORITY |
| | ⇒ | |
| | 《adv ?》\<v 下さい\>\<cp って\>\<v 言っ\>\<aux た\>\<cp じゃ\>\<aux ない\>\<fp か\>\<aux ない\>\<fp か\> | 1 |
| 1607 | \<adv 急いで\>\<cp って\>《v ?》\<aux た\>\<cp じゃ\>\<aux ない\>\<fp か\> | PRIORITY |
| | ⇒ | |
| | \<adv ?\>\<v 下さい\>\<cp って\>《v ?》\<aux た\>\<cp じゃ\>\<aux ない\>\<fp か\>\<aux ない\>\<fp か\> | 1 |
| 1608 | 《adv ?》\<cp って\>《v ?》\<aux た\>\<cp じゃ\>\<aux ない\>\<fp か\> | PRIORITY |
| | ⇒ | |
| | 《adv ?》\<v 下さい\>\<cp って\>《v ?》\<aux た\>\<cp じゃ\>\<aux ない\>\<fp か\>\<aux ない\>\<fp か\> | 1 |

FIG.22

| | PRIORITY |
|---|---|
| 2001 — 《adv ?》<cp って>《v ?》《*》 | |
| ⇒ | 2 |
| 《adv ?》<v して><cp と>《v ?》《*》 | |

FIG.23

| | 121 PRIORITY |
|---|---|
| 2101 — 《adv ?》<cp って>《v ?》《*》 | |
| ⇒ | 2 |
| 《adv ?》<v して><cp と>《v ?》《*》 | |
| 2102 — 《v ?》<aux なきゃ>《*》 | PRIORITY |
| ⇒ | 3 |
| 《v ?》<aux ないと>《*》 | |

FIG.24

| | 121 |
|---|---|
| 《adv ?》<cp って>《v ?》《*》 | PRIORITY |
| ⇒ | 1 |
| 《adv ?》<v して><cp と>《v ?》《*》 | |
| 《v ?》<aux なきゃ>《*》 | PRIORITY |
| ⇒ | 3 |
| 《v ?》<aux ないと>《*》 | |
| (s (pp <adv 急いで> <cp って>)(vp <v 言っ> (aux (aux(<aux た><cp じゃ>)<aux ない><fp か>))) | PRIORITY |
| ⇒ | 5 |
| (s (pp (vp <adv 急いで> <v 下さい>)<cp って>)(vp <v 言っ>(aux(aux (<aux た><cp じゃ><aux ない><fp か>))) | |
| (s (pp 《adv ?》 <cp って>)(vp <v 言っ> (aux (aux(<aux た><cp じゃ>)<aux ない><fp か>))) | PRIORITY |
| ⇒ | 3 |
| (s (pp (vp《adv ?》 <v 下さい>)<cp って>)(vp <v 言っ> (aux (aux(<aux た><cp じゃ>)<aux ない><fp か>))) | |
| (s (pp <adv 急いで> <cp って>)(vp《v ?》 (aux (aux(<aux た><cp じゃ>)<aux ない><fp か>))) | PRIORITY |
| ⇒ | 3 |
| (s (pp (vp <adv 急いで> <v 下さい>)<cp って>)(vp《v ?》 (aux (aux(<aux た><cp じゃ>)<aux ない><fp か>))) | |
| (s (pp (vp《adv ?》 <cp って>)(vp《v ?》 (aux (aux(<aux た><cp じゃ>)<aux ない><fp か>))) | PRIORITY |
| ⇒ | 3 |
| (s (pp (vp《adv ?》 <v 下さい>)<cp って>)(vp《v ?》 (aux (aux(<aux た><cp じゃ>)<aux ない><fp か>))) | |
| <adv 急いで><cp って><v 言っ><aux た><cp じゃ><aux ない><fp か> | PRIORITY |
| ⇒ | 3 |
| <adv 急いで><v 下さい><cp って><v 言っ><aux た><cp じゃ><aux ない><fp か>><aux ない><fp か> | |
| 《adv ?》<cp って><v 言っ><aux た><cp じゃ><aux ない><fp か> | PRIORITY |
| ⇒ | 1 |
| 《adv ?》<v 下さい><cp って><v 言っ><aux た><cp じゃ><aux ない><fp か>><aux ない><fp か> | |
| <adv 急いで><cp って>《v ?》<aux た><cp じゃ><aux ない><fp か> | PRIORITY |
| ⇒ | 1 |
| <adv 急いで><v 下さい><cp って>《v ?》<aux た><cp じゃ><aux ない><fp か>><aux ない><fp か> | |
| 《adv ?》<cp って>《v ?》<aux た><cp じゃ><aux ない><fp か> | PRIORITY |
| ⇒ | 1 |
| 《adv ?》<v 下さい><cp って>《v ?》<aux た><cp じゃ><aux ない><fp か>><aux ない><fp か> | |

FIG.25

2301 ●SOURCE LANGUAGE SENTENCE Si :
「急いでってお願いしたじゃないか。」

2302 ●MORPHEME SEQUENCE Sm :
<adv 急いで><cp って><v お願いし><aux た><cp じゃ><aux ない><fp か>

2303 ●SYNTACTIC STRUCTURE Sa :
(s (pp <adv 急いで> <cp って>) (vp <v お願いし> (aux (aux (<aux た><cp じゃ>)<aux ない>)<fp か>)))

2304 ●TARGET LANGUAGE SENTENCE To:
Hurry. I ask.

2305 ●RESULT OF TRANSLATION PROCESS Tr :
部分訳になりました。

2306 ●SOURCE LANGUAGE PARAPHRASE SENTENCE Sp :
「急いで下さいってお願いしたじゃないか。」

FIG.26

| | |
|---|---|
| 《adv ?》<cp って>《v ?》《*》 | PRIORITY |
| ⇒ | 1 |
| 《adv ?》<v して><cp と>《v ?》《*》 | |
| (s (pp <adv 急いで> <cp って>)(vp《v ?》 (aux (aux(<aux た><cp じゃ>)<aux ない><fp か>))) | PRIORITY |
| ⇒ | 3 |
| (s (pp (vp <adv 急いで> <v 下さい>)<cp って>)(vp《v ?》 (aux (aux(<aux た><cp じゃ>)<aux ない><fp か>))) | |
| (s (pp《adv ?》 <cp って>)(vp《v ?》 (aux (aux(<aux た><cp じゃ>)<aux ない><fp か>))) | PRIORITY |
| ⇒ | 3 |
| (s (pp (vp《adv ?》 <v 下さい>)<cp って>)(vp《v ?》 (aux (aux(<aux た><cp じゃ>)<aux ない><fp か>))) | |
| <adv 急いで><cp って><v ?><aux た><cp じゃ><aux ない><fp か> | PRIORITY |
| ⇒ | 1 |
| <adv 急いで><v 下さい><cp って>《v ?》<aux た><cp じゃ><aux ない><fp か>><aux ない><fp か> | |
| 《adv ?》<cp って><v ?><aux た><cp じゃ><aux ない><fp か> | PRIORITY |
| ⇒ | 1 |
| 《adv ?》<v 下さい><cp って>《v ?》<aux た><cp じゃ><aux ない><fp か>><aux ない><fp か> | |

| | 121 |
|---|---|
| 《adv ?》<cp って>《v ?》《*》 | PRIORITY |
| ⇒ | 1 |
| 《adv ?》<v して><cp と>《v ?》《*》 | |
| 《v ?》<aux なきゃ>《*》 | PRIORITY |
| ⇒ | 3 |
| 《v ?》<aux ないと>《*》 | |
| (s (pp <adv 急いで> <cp って>)(vp <v 言っ> (aux (aux(<aux た><cp じゃ>)<aux ない><fp か>))) | PRIORITY |
| ⇒ | 5 |
| (s (pp (vp <adv 急いで> <v 下さい>)<cp って>)(vp <v 言っ>(aux(aux (<aux た><cp じゃ><aux ない><fp か>))) | |
| (s (pp (vp《adv ?》<cp って>)(vp <v 言っ> (aux (aux(<aux た><cp じゃ>)<aux ない><fp か>))) | PRIORITY |
| ⇒ | 3 |
| (s (pp (vp《adv ?》<v 下さい>)<cp って>)(vp <v 言っ> (aux (aux(<aux た><cp じゃ>)<aux ない><fp か>))) | |
| (s (pp <adv 急いで> <cp って>)(vp《v ?》(aux (aux(<aux た><cp じゃ>)<aux ない><fp か>))) | PRIORITY |
| ⇒ | 4 |
| (s (pp (vp <adv 急いで> <v 下さい>)<cp って>)(vp《v ?》(aux (aux(<aux た><cp じゃ>)<aux ない><fp か>))) | |
| (s (pp (vp《adv ?》<cp って>)(vp《v ?》(aux (aux(<aux た><cp じゃ>)<aux ない><fp か>))) | PRIORITY |
| ⇒ | 4 |
| (s (pp (vp《adv ?》<v 下さい>)<cp って>)(vp《v ?》(aux (aux(<aux た><cp じゃ>)<aux ない><fp か>))) | |
| <adv 急いで><cp って><v 言っ><aux た><cp じゃ><aux ない><fp か> | PRIORITY |
| ⇒ | 3 |
| <adv 急いで><v 下さい><cp って><v 言っ><aux た><cp じゃ><aux ない><fp か>><aux ない><fp か> | |
| 《adv ?》<cp って><v 言っ><aux た><cp じゃ><aux ない><fp か> | PRIORITY |
| ⇒ | 1 |
| 《adv ?》<v 下さい><cp って><v 言っ><aux た><cp じゃ><aux ない><fp か>><aux ない><fp か> | |
| <adv 急いで><cp って>《v ?》<aux た><cp じゃ><aux ない><fp か> | PRIORITY |
| ⇒ | 2 |
| <adv 急いで><v 下さい><cp って>《v ?》<aux た><cp じゃ><aux ない><fp か>><aux ない><fp か> | |
| 《adv ?》<cp って>《v ?》<aux た><cp じゃ><aux ない><fp か> | PRIORITY |
| ⇒ | 2 |
| 《adv ?》<v 下さい><cp って>《v ?》<aux た><cp じゃ><aux ない><fp か>><aux ない><fp か> | |

FIG.28

2601 ●SOURCE LANGUAGE SENTENCE Si :
「急いで下さいってお願いしたじゃないか。」

2602 ●MORPHEME SEQUENCE Sm :
<adv 急いで><v 下さい><cp って><v お願いし><aux た><cp じゃ><aux ない><fp か>

2603 ●SYNTACTIC STRUCTURE Sa :
(s (pp (vp <adv 急いで> <v 下さい><cp って>) (vp <v お願いし> (aux (aux (<aux た><cp じゃ>)<aux ない>)<fp か>)))

2604 ●TARGET LANGUAGE SENTENCE To :
I asked you to hurry up.

2605 ●RESULT OF TRANSLATION PROCESS Tr :
正常に翻訳されました。

COMMUNICATION SUPPORT APPARATUS AND COMPUTER PROGRAM PRODUCT FOR SUPPORTING COMMUNICATION BY PERFORMING TRANSLATION BETWEEN LANGUAGES

CROSS-REFERENCE TO RELATED APPLICATIONS

This application is based upon and claims the benefit of priority from the prior Japanese Patent Application No. 2005-187375, filed on Jun. 27, 2005; the entire contents of which are incorporated herein by reference.

BACKGROUND OF THE INVENTION

1. Field of the Invention

The present invention relates to a communication support apparatus, a communication support method, and a computer program product for supporting communication by performing translation between a plurality of languages.

2. Description of the Related Art

Recently, an opportunity of interlingual communication has been increased because of growing globalization, development of a computer network technology, or the like. On the other hand, a machine translation device for translating any text written in Japanese, for example, to a text in another language such as in English, is developed and put to practical use, with the development in natural language processing technology.

Further with the development in speech processing technology, a speech synthesis device for transforming a natural language string existing as electronic data into a speech output, and a speech input device, which enables an input of the natural language string by speech, by string transforming a speech by a user are put into practical use.

With such development in the natural language processing technology and the speech processing technology, it is highly expected to integrate these technologies together, thereby realizing a communication supporting apparatus for supporting a communication between those whose mother tongues are different.

To realize a robust machine translation, a grammar rule capable of covering a wide range of language phenomena, a large-scale word dictionary, translation knowledge, or the like are required. Further especially, in order to realize a translation device allowing a free speech, it is indispensable to solve a variety of language phenomena, which affects a translation result, represented by a non-grammaticality such as inversion and abbreviation, in addition to problems such as polysemy and ambiguity occurring even in a speech restricted to some extent. As described above, a realization of the translation device capable of processing a variety of user speech robustly, and having a highly accurate translation performance is a very hard subject.

In order to realize a highly accurate translation, technology, in which a sentence paraphrased to facilitate the translation from an input sentence, is offered to a user, and a translation process is executed to a sentence selected by the user, is suggested in Published International Application No. WO 00/13102 A1.

In general, if the translation process itself is failed, or only a partial translation is obtained by the translation process, so that speech content of the user is not correctly transmitted to a target language speaker, the user indicates re-input or re-process to the translation machine in order to try the translation process again.

However, since the translation machine generally outputs the same translation result by executing the re-input or re-process of the same speech, there has been a problem that the speech content is never correctly transmitted. Further in order to avoid the problem and to output a different translation result, the user had to express the content to be transmitted by using another expression within a source language, and if possible, the user had to re-input another expression after estimating a sentence translatable by the translation machine.

In the method in Published International Application No. WO 00/13102 A1, a paraphrase sentence is offered before the translation process. However, the user cannot consider what kind of sentence is translatable by the translation machine, or what was wrong with the last speech content to fail in translation. Therefore, the user can never assume or speak an input sentence that enables correct translation by the translation machine.

SUMMARY OF THE INVENTION

According to one aspect of the present invention, a communication supporting apparatus includes an input accepting unit that accepts a source language sentence to be translated input by a user; a paraphrase knowledge storing unit that stores paraphrase knowledge in which a source language interpretation which is an interpretation of the semantic content of the source language sentence is associated with a paraphrase interpretation having the same semantic content as the source language interpretation and a different expression form; a source language analyzing unit that analyzes the semantic content of the input source language sentence and outputs the source language interpretation; a paraphrasing unit that obtains the paraphrase interpretation associated with the output source language interpretation from the paraphrase knowledge storing unit, and paraphrases the input source language sentence in a source language paraphrase sentence based on the obtained paraphrase interpretation; and a translation unit that translates the output source language interpretation into a first target language sentence and translates the obtained paraphrase interpretation into a second target language sentence.

According to another aspect of the present invention, a communication supporting method includes accepting a source language sentence to be translated, input by a user; analyzing the semantic content of the input source language sentence; outputting a source language interpretation; obtaining a paraphrase interpretation associated with the output source language interpretation from a paraphrase knowledge storing unit which stores the source language interpretation and the paraphrase interpretation having the same semantic content as the source language interpretation and a different expression form in association with each other, paraphrasing the input source language sentence in a source language paraphrase sentence based on the obtained paraphrase interpretation; translating the output source language interpretation into a first target language sentence and the obtained paraphrase interpretation into a second target language sentence.

According to still another aspect of the present invention, a computer program product has a computer readable medium including programmed instructions for performing a communication support processing. The instructions, when executed by a computer, cause the computer to perform accepting a source language sentence to be translated, input by a user; analyzing the semantic content of the input source language sentence; outputting a source language interpretation; obtaining a paraphrase interpretation associated with the output source language interpretation from a paraphrase knowledge storing unit which stores the source language interpretation and the paraphrase interpretation having the same semantic content as the source language interpretation and a different expression form in association with each other, paraphrasing the input source language sentence in a source language paraphrase sentence based on the obtained paraphrase interpretation; translating the output source language interpretation into a first target language sentence and the obtained paraphrase interpretation into a second target language sentence.

BRIEF DESCRIPTION OF THE DRAWINGS

FIG. 2 is a schematic diagram showing an example of data processed at the communication supporting apparatus according to the first embodiment;

FIG. 3 is a schematic diagram showing an example of a data structure of a paraphrase knowledge storing unit;

FIG. 10 is a schematic diagram showing an example of a data structure of an input record storing unit;

FIG. 11 is a schematic diagram showing an example of paraphrase knowledge extracted by a paraphrase knowledge extracting unit;

FIGS. 12A, 12B, and 12C show a flowchart of a communication supporting process in the second embodiment;

FIG. 13 is a flowchart of a paraphrase knowledge extracting process;

FIG. 14 is a schematic diagram showing an example of a data structure of a paraphrase knowledge storing unit;

FIG. 15 is a schematic diagram showing an example of data output in the communication supporting process;

FIG. 16 is a schematic diagram showing an example of data output in the communication supporting process;

FIG. 17 is a schematic diagram showing an example of a data structure of input/re-input set [I];

FIG. 18 is a schematic diagram showing an example of paraphrase knowledge obtained by the paraphrase knowledge extracting process;

FIG. 22 is a schematic diagram showing an example of paraphrase knowledge set [P];

FIG. 23 is a schematic diagram showing an example of a paraphrase knowledge storing unit;

FIG. 24 is a schematic diagram showing an example of data stored in the paraphrase knowledge storing unit;

FIG. 25 is a schematic diagram showing an example of the data output by the communication supporting process;

FIG. 26 is a schematic diagram showing an example of the paraphrase knowledge set [P];

FIG. 27 is a schematic diagram showing an example of the paraphrase knowledge storing unit; and FIG. 28 is a schematic diagram showing an example of the data output by the communication supporting process.

DETAILED-DESCRIPTION OF THE INVENTION

Exemplary embodiments of a communication supporting apparatus, a communication supporting method, and a computer program product according to the present invention is described in detail below with reference to the accompanying drawings.

The communication supporting apparatus according to a first embodiment is configured to transform an input source language sentence to a source language paraphrase sentence, having the same or equivalent semantic content as the input source language sentence and a different expression form, by referring to paraphrase knowledge stored in storing unit in advance, thereby offering the same to a user. While it is described on condition that a translation process is performed from Japanese, as a source language to English, as a target language, a combination of the source language and the target language is not limited to this, and the apparatus is applicable to every combination of languages.

Figure 1:
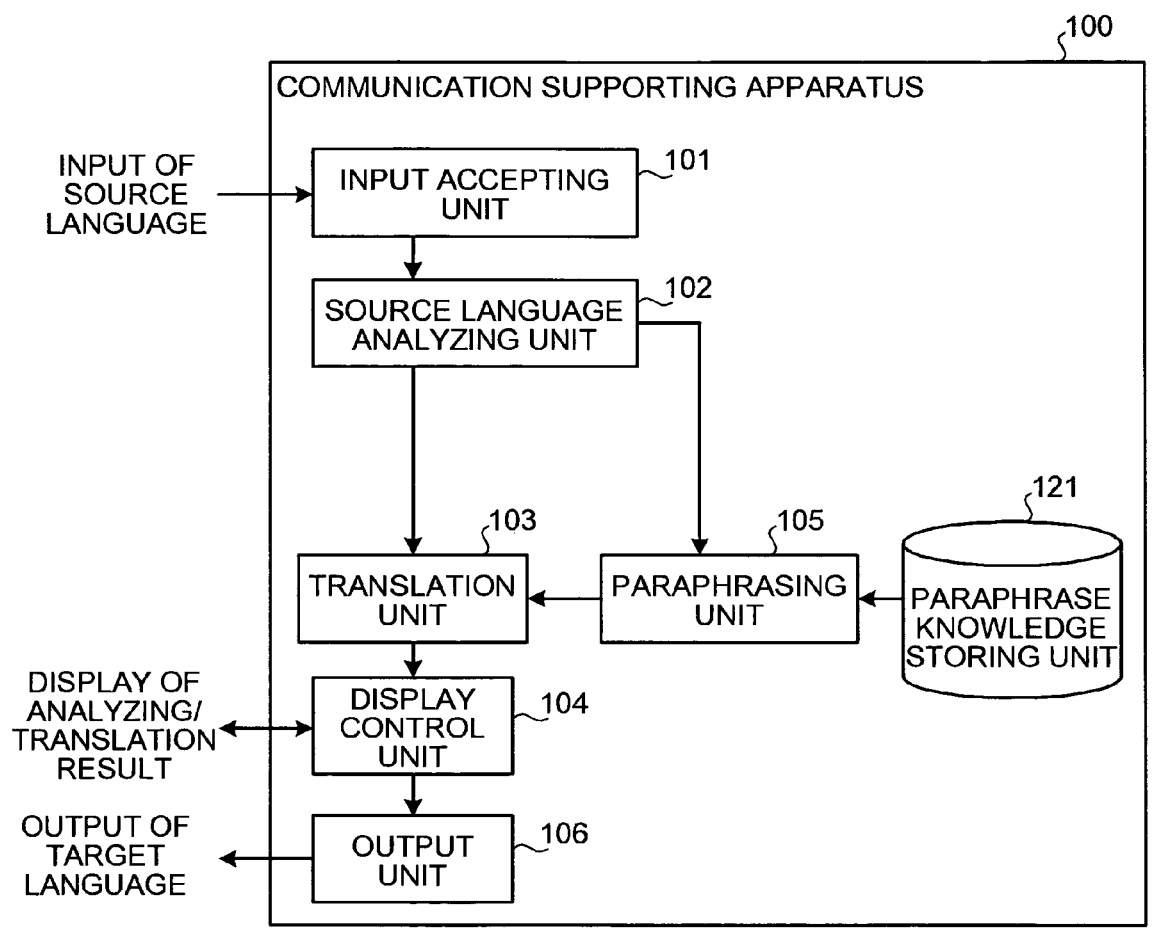
FIG. 1 is a block diagram showing a structure of a communication supporting apparatus according to a first embodiment.

FIG. 1 is a block diagram showing a structure of a communication supporting apparatus 100 according to the first embodiment. The communication supporting apparatus 100 is provided with an input accepting unit 101, a source language analyzing unit 102, a translation unit 103, a display control unit 104, a paraphrasing unit 105, an output unit 106, and a paraphrase knowledge storing unit 121.

The input accepting unit 101 is configured to accept an input of the source language sentence from the user. The source language can be input by applying all generally-used input methods, such as a keyboard, a pointing device, a handwriting recognition, or the like. Further the input accepting unit 101 can be configured so as to accept speech input from the user and perform a speech recognition process to the accepted speech, thereby outputting the source language sentence.

The speech recognition process can be performed by applying all generally-used speech recognition method using Linear Predictive Coefficient analysis, Hidden Markov Model (HMM), Dynamic programming, Neural network, N-gram language modeling, or the like.

The source language analyzing unit 102 is configured to output a source language interpretation, which is an interpretation of semantic content represented by the source language sentence, by performing a natural language analysis process such as morphological analysis, syntactic analysis, dependency analysis, semantic analysis, discourse analysis, or the like, by referring to lexical information and a grammar rule of the source language, to the source language sentence accepted by the input accepting unit 101.

All generally-used methods, such as the morphological analysis using an A*algorism, the syntactic analysis using an early parsing, a chart parsing, a generalized LR parsing, and the like, can be applied to the natural language analysis process performed by the source language analyzing unit 102. Further, a dictionary for a natural language process, which stores morphological information, syntactic information, semantic information, and the like, is stored in generally-used storing unit, such as an HDD (Hard Disk Drive), an optical disc, a memory card, a RAM (Random Access Memory), and is referred to in the natural language analysis process.

In the first embodiment, a morpheme sequence and a syntactical structure of the source language sentence are output as the source language interpretation. The morpheme sequence is a result of the morphological analysis of the source language sentence, and is the sequence composed of a combination of a word composing the source language sentence and a part of speech thereof. Further the syntactical structure is a result of the syntactical analysis of the source language sentence, in which a source language structure is analyzed by using the grammar rule, such as context free grammar or the like.

An example of a form of the source language interpretation output by the source language analyzing unit 102 is shown hereinafter. FIG. 2 is a schematic diagram showing an example of data processed by the communication supporting apparatus according to the first embodiment. When a source language sentence A201 shown in the drawing is input, the morpheme sequence relative to the same is given in the form shown in a morpheme sequence A202 in the drawing.

The morpheme sequence A202 indicates that the source language sentence A201 can be divided into three words, which are words A203, A204, and A205, shown in the drawing, and the parts of speech corresponding to each grammar category, thereof, which are "pron," "cm," and "v" are assigned, respectively.

Further, the syntactical structure relative to the source language sentence A201 is given in the form shown in the syntactical structure A206 in the drawing.

The syntactical structure A206 is the form representing a replace relationship between the word and the grammar category, corresponding to an input surface. That is to say, a syntactical structure A207, which is a part of the syntactical structure A206, indicates that the grammar categories pron and cm can be replaced by the grammar category np, and further, the syntactical structure A206 indicates that the grammar categories np and vp can be replaced by the grammar category s.

The above description form is shown as an example, and all conventionally-used description forms of morpheme sequence and of syntactical structure are available.

The translation unit 103 is configured to translate the source language sentence in Japanese to a target sentence in English. All methods used in a machine translation system, such as a general transfer method, an example-based method, a statistic-based method, an interlingua method, are applicable to the translation process performed at the translation-unit 103.

The display control unit 104 is configured to offer defect information of the process occurred in the analysis process of the source language sentence by the source language analyzing unit 102 and in the translation process by the translation unit 103 of the source language sentence to the user. That is to say, the user can refer not only a translation result of the input source language sentence, but also success and failure of a series of analysis and translation process and problems when examining a next source language sentence to be input. For example, information showing that the sentence is partially translated is offered as the defect information.

The target language sentence generated by the translation unit 103 is also offered. By this, the user who understands the target language can directly estimate adequacy of an offered translation result.

Further the display control unit 104 may be configured to offer a source language paraphrase sentence output by the paraphrasing unit 105 to the user, and send the source language paraphrase sentence to the input accepting unit 101 as an input of the source language sentence, if the user selects the offered source language paraphrase sentence. By doing so, a burden on the user to re-input the source language sentence is reduced.

The paraphrase knowledge storing unit 121 is configured to store paraphrase knowledge, in which the source language interpretation which is the interpretation of semantic content of the source language sentence to be translated, is associated with a paraphrase interpretation, having the same or equivalent semantic content as that of the source language interpretation and a different expression form. Further the paraphrase knowledge storing unit 121 may be configured to store the paraphrase knowledge by associating the same with priority representing an order of priority in applying the paraphrase knowledge. In the present embodiment, the priority is expressed as discrete values from 1 to 10, and it is configured such that the paraphrase knowledge having larger value is adopted to a paraphrasing process with priority. Meanwhile, an expression of priority is not limited to this, and any criteria representing the order of priority in applying the paraphrase knowledge can be used. The paraphrase knowledge storing unit 121 can be composed of all generally-used storing unit, such as HDD, optical disc, memory card, RAM, or the like.

FIG. 3 is a schematic diagram showing an example of a data structure of the paraphrase knowledge storing unit 121. As shown in the drawing, the paraphrase knowledge storing unit 121 stores the paraphrase knowledge and the priority, which are associated with each other. The source language interpretation and the paraphrase interpretation indicating the paraphrase knowledge can be represented by either of the syntactic structure and the morpheme sequence.

In an example shown in the drawing, the paraphrase knowledge 201 is represented by a combination of the syntactic structure of the source language sentence to be transformed and a transformed syntactic structure. Further, the paraphrase knowledge 202 is represented by the combination of the morpheme sequence of the source language sentence to be transformed and a transformed morpheme sequence.

Herein, a part which represents the syntactic structure to be transformed or the morpheme sequence to be transformed is referred to as an antecedent part. When the source language sentence is input, the antecedent part, which conforms to the source language interpretation relative to the source language sentence, is searched, and the paraphrase interpretation associated with the searched antecedent part is obtained and used in the paraphrasing process. In an example shown in the drawing, an antecedent part 203 represented by the syntactic structure and an antecedent part 204 represented by the morpheme sequence are indicated. The antecedent parts 203 and 204 correspond to the source language interpretation, and the transformed syntactic structure 210 corresponds to the paraphrase interpretation.

In the paraphrase knowledge, the syntactic structure and the morpheme sequence can be represented by variable parts 205 and 207, and are capable of being dynamically assigned, each enclosed in double parentheses, and invariable part 206, which is other general linguistic expression and impossible of compiling. The syntactic structure and the morpheme sequence in the paraphrase knowledge can be represented only by the variable part or only by the invariable part.

The variable part can be represented by a form of "<<grammar category?>>" by using a mark '?'. This means that any word belonging to a described grammar category can be assigned. The variable part may also be represented by a form of "<<*>>" by using a mark '*', as shown in the invariable part 207 in the drawing. This means that any syntactic structure or morpheme sequence can be assigned to the variable part.

The paraphrasing unit 105 is configured to obtain an applicable paraphrase knowledge from the paraphrase knowledge storing unit 121 by using the morpheme sequence and the syntactical structure, which are results of the analysis of the source language sentence by the source language analyzing unit 102, as retrieval keys, and apply the obtained paraphrase knowledge to the source language sentence, thereby generating the source language paraphrase sentence.

Herein, the phrase "the paraphrase knowledge is applicable" means that the syntactic structure to be transformed or the morpheme sequence, being the antecedent part of each paraphrase knowledge can be assigned to the syntactic structure or the morpheme sequence relative to the input source language sentence. When a plurality of applicable paraphrase knowledge exists, the one having the highest suitability is adopted. It may be configured to adopt a predetermined number of paraphrase knowledge in descending order of suitability, and output a plurality of source language paraphrase sentences.

The suitability is calculated so as to make the antecedent part of the paraphrase knowledge such that a ratio thereof to cover the syntactic structure and the morpheme sequence relative to the input source language sentence is large, the number of invariables thereof is small, and the same is larger as the priority of the paraphrase knowledge is larger. Further it is calculated such that the antecedent part of the paraphrase knowledge of the syntactic structure is larger than that of the morpheme sequence. A dynamic programming for calculating assignment of the antecedent part so as to make structural and surface conformity thereof maximum can be applied to the estimation.

If the priority of the paraphrase knowledge is not stored in the paraphrase knowledge storing unit 121, the paraphrasing unit 105 calculates the suitability by using an element other than the priority. Further the paraphrasing unit 105 may be configured to attempts the translation process by the translation unit 103 to the generated source language paraphrase sentence, and to output the source language paraphrase sentence after confirming that the translation is to succeed, and the error occurring on initial input is to be prevented.

The output unit 106 is configured to receive the target language sentence translated by the translation unit 103, and output the content thereof as synthetic speech in English, as the target language. All generally-used methods such as phonemes compiling speech synthesis, formant speech synthesis, corpus-based speech synthesis, a text-to-speech, or the like, are applicable to a speech synthesis process performed by the output unit 106.

A speech output by the output unit 106 may be omitted. That is to say, it may be configured to perform a text input of the source language by the input device such as keyboard, pointing device, or the like, and a text output of the target language by a display device such as a display on which a text is displayed, instead of the speech input by the input accepting unit 101 and the speech output by the output unit 106. It may also be configured to output the target language sentence by text print to a printer or the like. Further, it may be configured to shift or combine the above-mentioned output methods if required.

Figure 4:
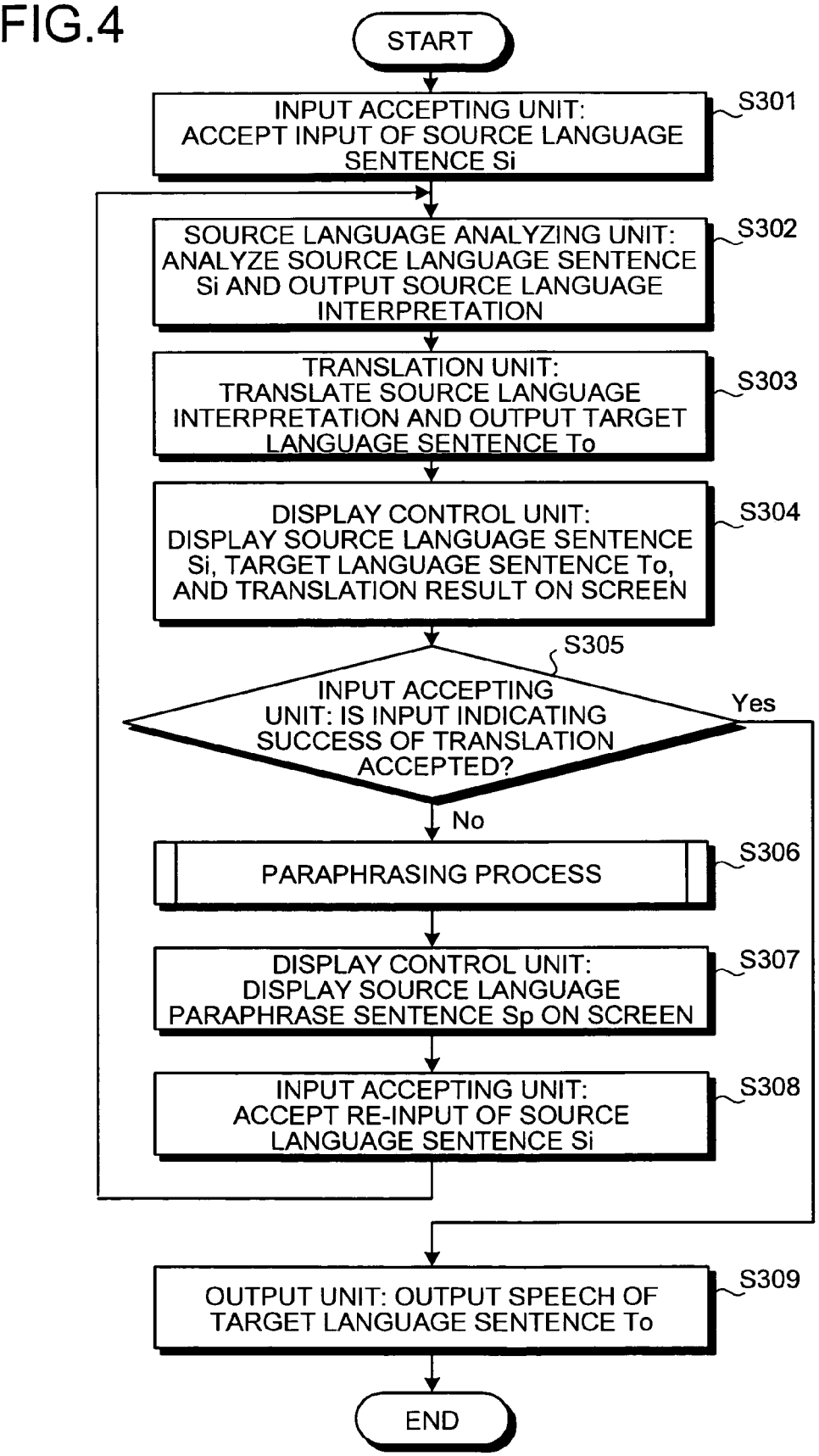
FIG. 4 is a flowchart of a communication supporting process in the first embodiment.

Next, a communication supporting process by the communication supporting apparatus 100 according to the first embodiment thus configured is explained. FIG. 4 is a flow-chart showing an entire flow of the communication supporting process in the first embodiment.

First, the input accepting unit 101 accepts the input of the source language sentence (hereinafter, referred to as Si) input by the user (step S301). Next, the source language analyzing unit 102 performs the natural language analysis process to the source language sentence Si, thereby outputting the source language interpretation (step S302). Specifically, the source language analyzing unit 102 outputs the morpheme sequence (hereinafter, referred to as Sm), which is a result of the morphological analysis, and the syntactic structure (hereinafter, referred to as Sa), which is a result of the syntactic analysis.

Next, the translation unit 103 outputs the target language sentence (hereinafter, referred to as To) described in the target language of the translation, by translating the source language interpretation output by the source language analyzing unit 102 (step S303).

Figure 5:
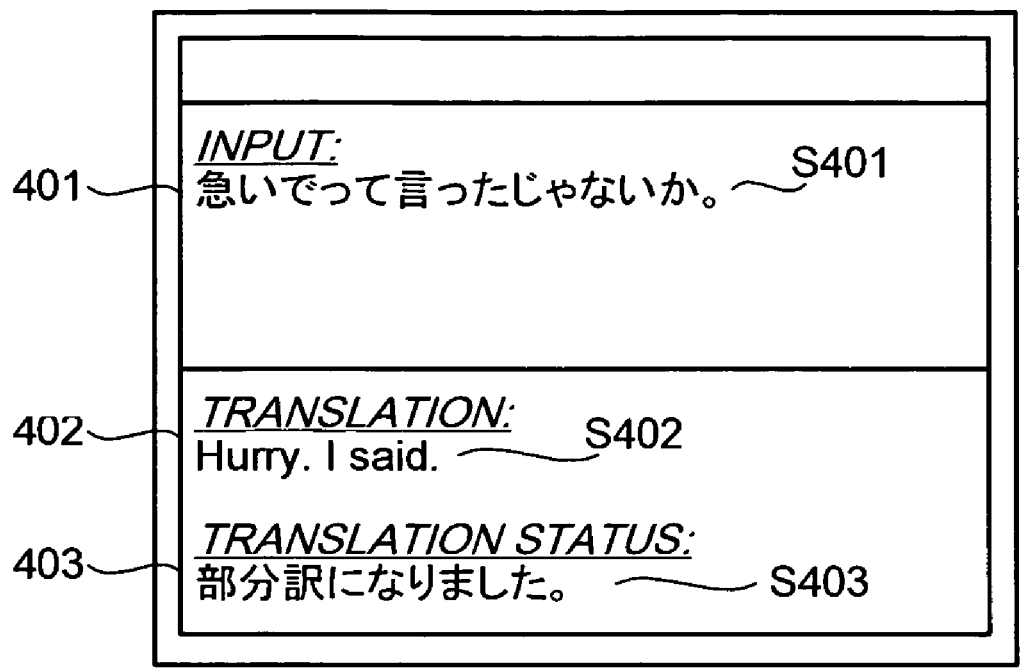
FIG. 5 is a schematic diagram showing an example of content of a screen for offering a translation result.

Further, the display control unit 104 displays the source language sentence Si, the target language sentence To, and a result of translation (hereinafter, referred to as Tr) on a translation result display (step S304). FIG. 5 is a schematic view showing an example of content of the translation result display. The translation result is defect information of the process occurring in the analysis process and in the translation process.

In the drawing, an input sentence display area 401 is a portion to display the source language sentence, which is a result of accepting the input of the newest user speech by the input accepting unit 101. A translation display area 402 is a portion to display the target language sentence, which is a result of the translation of the source language sentence. A translation status display area 403 is a portion to display the translation result Tr.

In the drawing, it is shown an example in which a source language sentence S401 is displayed as the input source language sentence and translated, thereby outputting a target language sentence S402 ("Hurry, I said.") in result, but a translation result S403 is displayed indicating that the translation is failed and only a partial translation is obtained.

The user determines whether or not the translation is normally performed in accordance with a speech intention, by referring to the information displayed on the translation result display, and inputs a success or failure of the translation.

Next, the input accepting unit 101 determines whether or not it has received an input indicating success of translation from the user (step S305). If the input accepting unit 101 has not received the success of translation (step S305: No), this performs the paraphrasing process to obtain the source language paraphrase sentence, (hereinafter, referred to as Sp), which is a paraphrase of the source language sentence Si (step S306). A detail of the paraphrasing process is described later.

Figure 6:
FIG. 6 is a schematic diagram showing an example of content of a screen for offering a paraphrase result.

After performing the paraphrasing process, the display control unit 104 displays the source language paraphrase sentence Sp obtained by the paraphrasing process on the paraphrase result display (step S307). FIG. 6 is a schematic diagram showing an example of content of the paraphrase result display. In the drawing, a modification example display area 501 is a portion to display the source language paraphrase sentence, which is a result of the paraphrase of the source language sentence by the paraphrasing process. The area 501 may be configured to emphatically display difference 502 between the source language sentence and the source language paraphrase sentence by an underline or the like.

The modification example display area 501 may be configured such that when the user determines that the source language paraphrase sentence displayed on the modification example display area 501 conforms to the speech intention, the user can directly select the source language paraphrase sentence as the source language to be input again by input unit such as a speech via microphone, keyboard, pointing device, or the like.

By the above-described process, it becomes possible to display the source language paraphrase sentence, which is an example of a sentence that can be translated correctly, and to emphatically display a paraphrased portion, for the user, even if the translation is failed. Consequently, the user can determine a reason of failure of the translation, and properly improve the expression. Further since a modified example sentence displayed can be input as the source language sentence, it becomes possible to reduce the burden to re-input the source language sentence.

After displaying by the display control unit 104, the input accepting unit 101 accepts re-input of the source language sentence Si (step S308), the operation returns to the analysis process of the source language sentence by the source language analyzing unit 102, and the process is repeated (step S302).

If it is determined that the input indicating success of the translation is received at step S305 (step S305: Yes), the output unit 106 speech-synthesizes the target language sentence To and outputs the same as speech in the target language (step S309), then the communication supporting process is ended.

The communication supporting apparatus 100 according to the first embodiment can output the speech of the target language sentence To, which is the result of the translation, without executing the paraphrasing process, for example, when the user determines that a translation result displayed first is successful without problem. For this reason, it is not required to select the paraphrased sentence regardless of success or failure of the translation process unlike in the case of the method in the first literature, thereby reducing the operation burden on the user.

Figure 7:
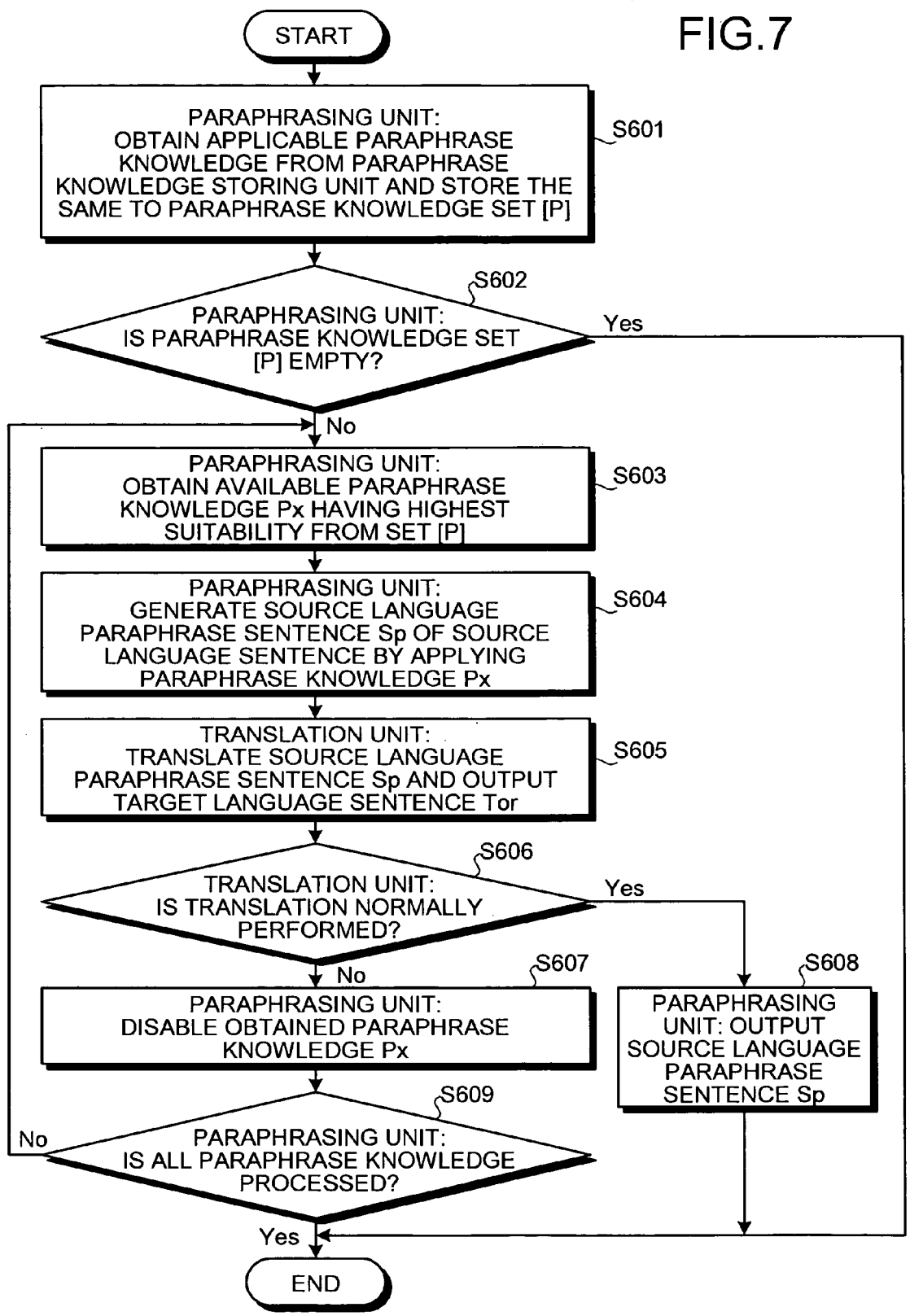
FIG. 7 is a flowchart of a paraphrasing process in the first embodiment.

Next, a detail of the paraphrasing process at step S306 is described. FIG. 7 is a flowchart showing an entire flow of the paraphrasing process in the first embodiment.

First, the paraphrase unit 105 obtains applicable paraphrase knowledge from the paraphrase knowledge storing unit 121, by means of the morpheme sequence Sm and the syntactic structure Sa which are analysis results of the source language sentence, as the retrieval keys, and stores the obtained paraphrase knowledge to paraphrase knowledge set [P] (step S601). The paraphrase knowledge set [P] is information to store the paraphrase knowledge to a storing unit such as RAM. The paraphrase knowledge set [P] shall be empty at the time of starting the paraphrasing process.

Next, the paraphrasing unit determines whether or not the paraphrase knowledge set [P] is empty (step S602). If the set [P.] is empty (step S602: Yes), the paraphrase knowledge to be applied does not exist and the source language paraphrase sentence cannot be output, thereby ending the paraphrasing process.

If the set [P] is not empty, (step S602: No), the paraphrasing unit 105 obtains available paraphrasing knowledge, having the highest suitability from [P] (hereinafter, referred to as Px) (step S603). Herein, the expression of "available paraphrase knowledge" means the paraphrase knowledge from which the paraphrase knowledge determined not to be correctly translated by a determination process of the translation result as described later is eliminated. Therefore, all paraphrase knowledge included in the set [P] is available in the first process.

Figures 8, 9:
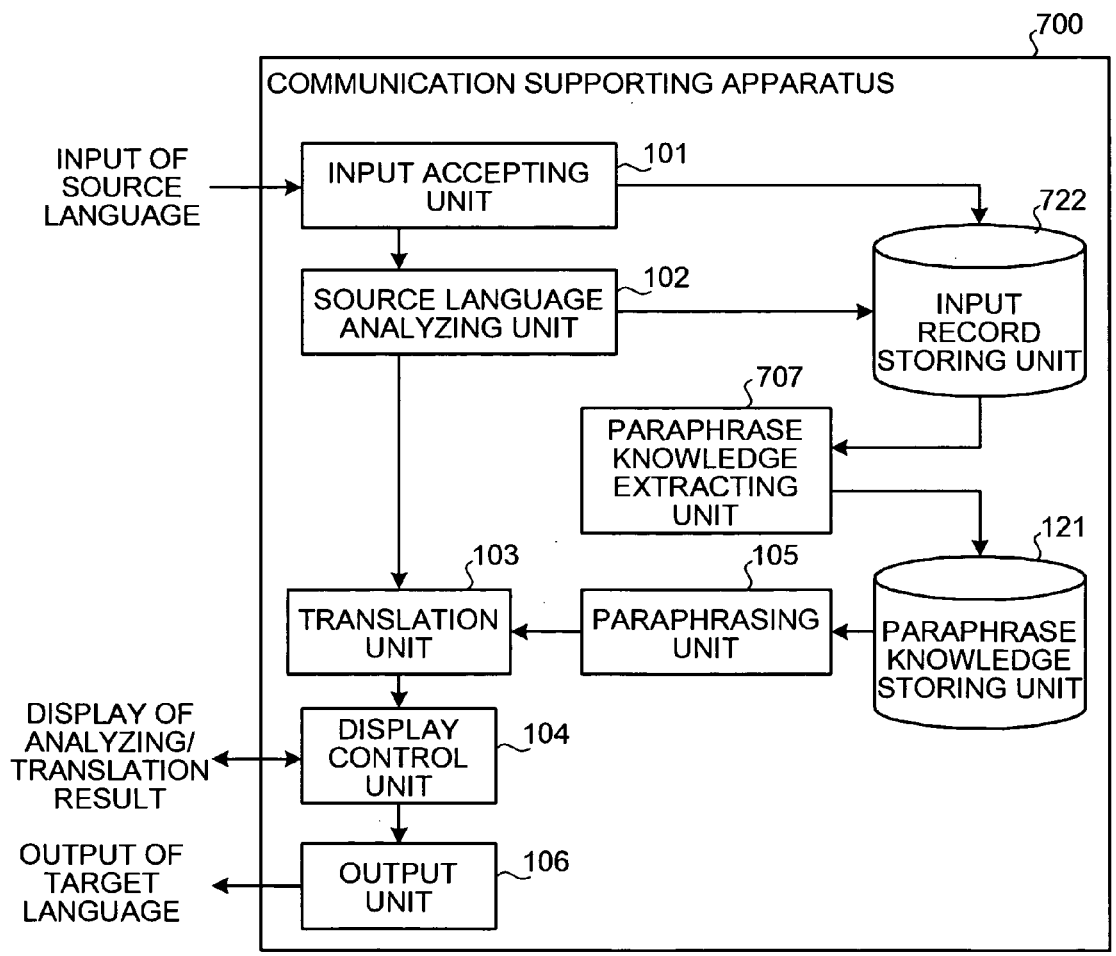
FIG. 8 is a schematic diagram showing an example of data processed at the communication supporting apparatus according to the first embodiment.
FIG. 9 is a block diagram showing a structure of a communication supporting apparatus according to a second embodiment.

Next, the paraphrasing unit 105 paraphrases the source language sentence by applying the obtained paraphrase knowledge Px, thereby generating the source language sentence Sp (step S604). For example, when the source language sentence as indicated by a source language sentence A801 in FIG. 8 is input, and the obtained paraphrase knowledge Px is the paraphrase knowledge as indicated by the paraphrase knowledge 201 in FIG. 3, a source language paraphrase sentence A802 in FIG. 8 is generated as the source language paraphrase sentence Sp.

Next, the translation unit 103 translates the source language paraphrase sentence Sp and outputs the target language sentence (hereinafter, referred to as Tor) (step S605). Further the translation unit 103 determines whether or not the translation process is normally performed (step S606). If the process is normally performed (step S606: Yes), the paraphrasing unit 105 outputs the source language paraphrase sentence Sp, thereby ending the paraphrasing process (step S608).

If the translation process is not normally performed (step S606: No), the paraphrasing unit 105 disables the obtained paraphrase knowledge Px (step S607). Next, the paraphrasing unit 105 determines whether or not all the paraphrase knowledge within the paraphrase knowledge set [P] is processed (step S609). If not all the paraphrase knowledge are processed (step S609: No), the paraphrasing unit 105 repeats the process by obtaining the paraphrase knowledge having the highest suitability (step S603). When all paraphrase knowledge are processed (step S609: Yes), the paraphrasing process is ended.

In this way, the communication supporting apparatus 100 according to the first embodiment can offer to the user the source language paraphrase sentence that can be translated by the same, having the same or equivalent semantic content as the input source language sentence and a different expression form, until the translation is normally completed. Therefore, the user can comprehend a cause of failure of the translation, and properly improve the input sentence by referring to the offered source language paraphrase sentence. Further, since it is possible to specify the offered source language paraphrase sentence as the source language sentence to be re-input, the burden of re-inputting is reduced.

A communication supporting apparatus according to a second embodiment is configured to extract the paraphrase knowledge from initial input, determined to be translated inadequately and is not adopted by the user, or each of re-input sentences relative to the same, and the re-input sentence finally adopted by the user, thereby registering the same as new paraphrase knowledge in the storing unit.

FIG. 9 is a block diagram showing a structure of a communication supporting apparatus 700 according to the second embodiment. As shown in the drawing, the communication supporting apparatus 700 is provided with an input accepting unit, a source language analyzing unit 102, a translation unit 103, a display control unit 104, a paraphrasing unit 105, an output unit 106, a paraphrase knowledge extracting unit 707, a paraphrase knowledge storing unit 121, and an input record storing unit 722.

The second embodiment is similar to the first embodiment except that the paraphrase knowledge extracting unit 707 and the input record storing unit 722 are added. Other structure and function are the same as those of the supporting apparatus 100 according to the first embodiment as shown in the block diagram in FIG. 1, so that the corresponding portions are designated by the same reference numerals, and are not herein described.

The input record storing unit 722 associates the source language sentence accepted by the input accepting unit 101, the morpheme sequence and the syntactic structure which are results of analysis of the source language sentence by the source language analyzing unit 102, and a re-input flag status on input of the source language sentence, with each other, and stores the same in the order of speech. The re-input flag has an OFF-state indicating that the input by the user is first input with respect to certain speech intention or speech content, and an ON-state indicating that this is the re-input of second time or after. By this, it becomes possible to specify a range re-input by the user when extracting the paraphrase knowledge.

FIG. 10 is a schematic diagram showing an example of a data structure of the input record storing unit 722. As shown in the drawing, the input record storing unit 722 associates a source language sentence 803, a morpheme sequence 804, which is a result of morphological analysis of the source language sentence 803, a syntactic structure 805, which is a result of syntactic analysis of the source language sentence 803, and a re-input flag status 806 with each other as an input record, and stores the same as a unit of one speech input. In the drawing, an example in which the input records 801 and 802 are stored is shown.

Each of the input records is arranged in reverse chronological order of input time, and in the above-described example, it is stored such that the upper indicated input record is the newer speech input. By referring to the input record storing unit 722, it can be detected, for example, that the speech corresponding to the input record 801 is newer than the speech corresponding to the input record 802, and that these are continuous speeches.

The paraphrase knowledge extracting unit 707 is configured to extract a group of the initial input, determined not to be translated adequately and is not adopted by the user, or each of re-input sentences relative to the same and the re-input sentence finally adopted by the user, as the paraphrase knowledge by grasping the group as paraphrase, which is transformation between the source language sentences.

FIG. 11 is a schematic diagram showing an example of the paraphrase knowledge extracted by the paraphrase knowledge extracting unit 707. The drawing shows an example of the paraphrase knowledge extracted when the source language sentence within the input record 802 in FIG. 10 is set to the initial input sentence and the source language sentence within the input record 801 is set to the re-input sentence. The paraphrase knowledge is extracted at following four stages and is stored in the paraphrase knowledge storing unit 121 with no overlaps.

First, the initial input sentence and the re-input sentence are each associated with the syntactic structure, which is the result of the structure analysis thereof, and extracted as the paraphrase knowledge. Here, initial priority is set to 5, in the present embodiment. Consequently, paraphrase knowledge 901 shown in FIG. 11, for example, is obtained.

Second, the syntactic structure, which is the result of the analysis of each of the initial input sentence and the re-input sentence, is associated with the syntactic structure a part of whose words is parameterized, and extracted as the paraphrase knowledge. Herein, the initial priority is set to 3, in the present embodiment. Consequently, paraphrase knowledge 902 shown in FIG. 11, for example, is obtained.

Third, each of the initial input sentence and the re-input sentence is associated with the morpheme sequence, which is the result of the morphological analysis thereof, and extracted as the paraphrase knowledge. Here, the initial priority is set to 3, in the present embodiment. Consequently, paraphrase knowledge 903 shown in FIG. 11, for example, is obtained.

Fourth, each of the morpheme sequence, which is the result of the morphological analysis of the initial input sentence and the re-input sentence, is associated with the morpheme sequence a part of whose words is parameterized, and extracted as the paraphrase knowledge. Here, the initial priority is set to 1 in the present embodiment. Consequently, paraphrase knowledge 904 shown in FIG. 11 is obtained for instance.

While an example in which only one word is parameterized is shown in the drawing, the paraphrase knowledge in which a plurality of words are parameterized and associated with each other may be extracted. Also, the process may be limited such that the grammatical categories that can be parameterized at the second and fourth steps is composed of, for example, content word, represented by a noun, a verb, and an adverb. Furthermore, the initial priority to be attributed to the paraphrase knowledge extracted at each of the steps may not be the value determined at each of the steps.

Figure 12B:
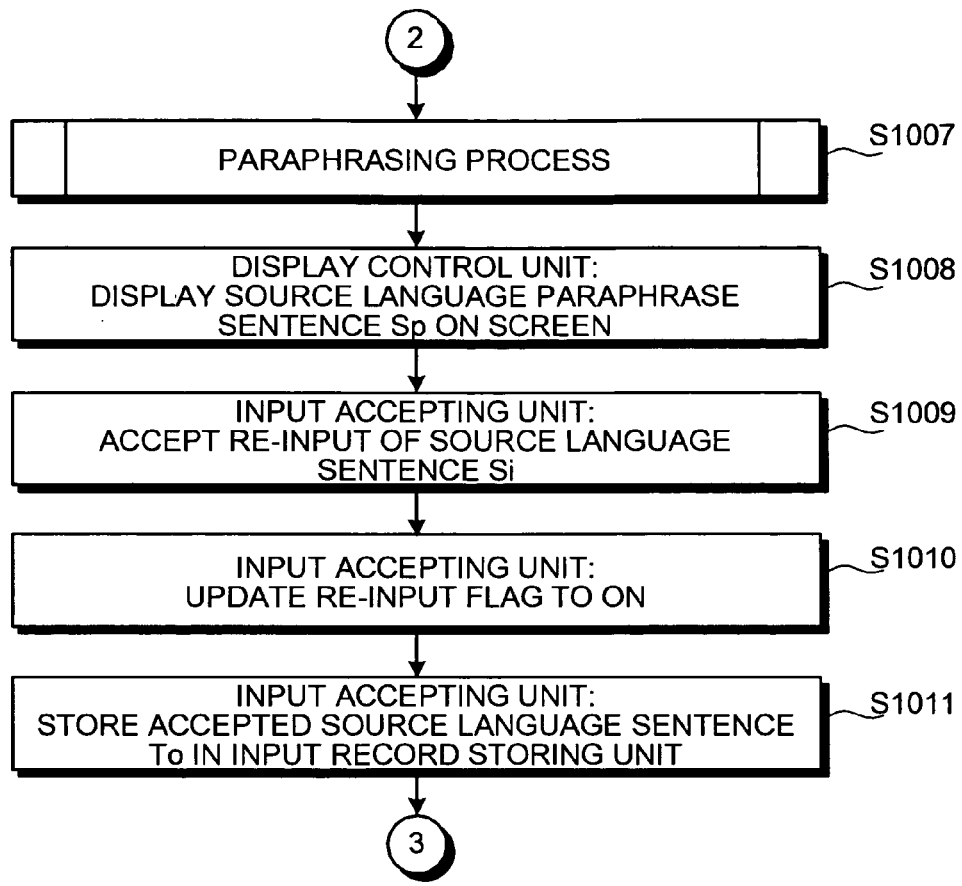
Figure 12C:
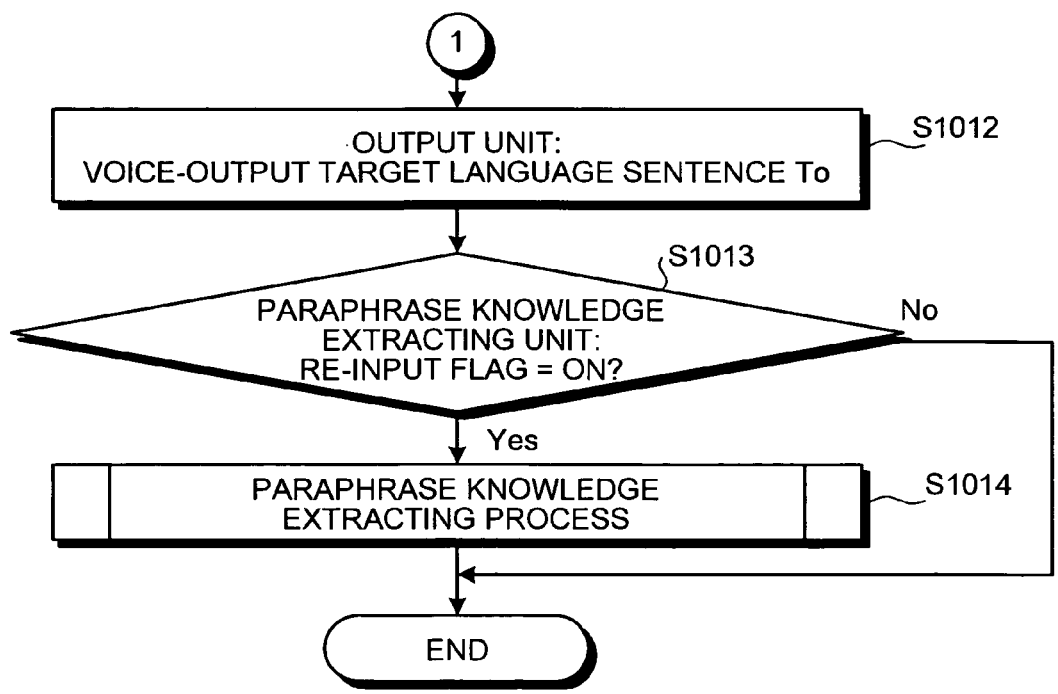

Next, a communication supporting process by the thus structured communication supporting apparatus 700 according to the second embodiment is described. FIGS. 12A, 12B, and 12C show a flowchart of the communication supporting process in the second embodiment.

First, the input accepting unit 101 accepts the input of the source language sentence Si input by the user (step S1001). Further the input accepting unit 101 sets the re-input flag for identifying whether a speech currently being input is re-input or normal input to OFF, to put the same in normal input state. The re-input flag is set to ON at step S1011 to be described later, and is referred to on a judgment whether or not to execute the paraphrase knowledge extracting process (step S1013).

Next, the input accepting unit 101 stores the accepted source language sentence Si to the input record storing unit 722 (step S1002). The source language sentence Si herein accepted is stored while being associated with an OFF-state of the re-input flag on input.

Then, the source language analyzing unit 102 executes the natural language analysis process with respect to the source language sentence Si to output the source language interpretation, and stores the source language interpretation to the input record storing unit 722 (step S1003). Specifically, the source language analyzing unit 102 outputs the morpheme sequence Sm which is the result of the morphological analysis, and the syntactic structure Sa which is the result of the syntactic analysis, and stores the same to the input record storing unit 722.

The translation process, the paraphrasing process, the displaying process, and the re-input acceptance process from step S1004 to step S1009 are processes similar to those from step S303 to step S308 of the communication supporting apparatus 100 according to the first embodiment, so that the explanations thereof are not repeated.

After accepting the re-input of the source language sentence at step S1009, the input accepting unit 101 resets the re-input flag to ON (step S1010), and the operation returns to the analysis process of the source language sentence by the source language analyzing unit 102, and the process is repeated (step S1003).

If it is determined that the input indicating success of the translation is accepted at step S1006 (step S1006: Yes), the output unit 106 speech-synthesizes the target language sentence To and outputs the same as the speech in the target language (step S1012).

Then, the communication supporting apparatus 700 according to the second embodiment executes the process of the following steps S1013 and S1014 for extracting the paraphrase knowledge from the input record of the source language sentence.

First, the paraphrase knowledge extracting unit 707 determines whether or not the re-input flag is set to ON (step S1013). If the flag is not set to ON (step S1013: No), the re-input of the source language sentence is not performed and the paraphrase knowledge to be extracted does not exist, so that the communication supporting process is ended.

If the flag is set to ON (step S1013: Yes), the paraphrase knowledge extracting process is performed (step S1014), and the communication supporting process is ended. A detail of the paraphrase knowledge extracting process will be described below.

FIG. 13 is a flowchart showing an entire flow of the paraphrase knowledge extracting process at step S1014. First, the paraphrase knowledge extracting unit 707 obtains the newest input record of the input records not yet obtained, from the input record storing unit 722 (step S1101). Next, the paraphrase knowledge extracting unit 707 obtains the source language sentence, the morpheme sequence, the syntactic structure from the obtained input record, and adds the same to input/re-input set [I] (step S1102). The input/re-input set [I] is information for storing the input record to the storing unit such as the RAM. The input/re-input set [I] shall be empty before extracting the paraphrase knowledge relative to a certain speech intention or speech content.

Next, the paraphrase knowledge extracting unit 707 determines whether or not the re-input flag corresponding to the obtained input record is set to ON (step S1103). If the flag is set to ON (step S1103: Yes), the unit repeats the process by obtaining a next input (step S1101). By doing so, it becomes possible to obtain all of the re-input sentences input relative to the initial input sentence about certain speech intention or speech content.

When the re-input flag is not set to ON (step S1103: No), it is determined that the initial input sentence relative to certain speech intention or speech content is achieved, then the paraphrase knowledge is extracted at steps S1104 and S1105 as follows.

First, the paraphrase knowledge extracting unit 707 obtains a group of a morpheme sequence (hereinafter, referred to as Im) and a syntactic structure (hereinafter, referred to as Ia), from the input/re-input set [I] (step S1104). Herein, since the speech which accepts the input indicating success of the translation, that is, the speech adopted by the user, is included in the morpheme sequence Sm and the syntactic structure Sa relative to the initial input sentence output at step S1003, the paraphrase knowledge in which the same are associated with the morpheme sequence Im and the syntactic structure Ia is stored to the paraphrase knowledge storing unit 121 (step S1105), then the paraphrase knowledge extracting process is ended. Here, the paraphrase knowledge having content similar to that already contained in the paraphrase knowledge storing unit 121 shall not be added, and transfer knowledge to determine a self transfer without a transfer operation shall be eliminated.

Next, a specific example of the communication supporting process in the second embodiment is described. FIG. 14 is a schematic diagram showing an example of the data structure of the paraphrase knowledge storing unit 121. Further FIG. 15 is a schematic diagram showing an example of data output at the communication supporting process in this example. Here, it is supposed that the paraphrase knowledge as shown in FIG. 14 is registered at the paraphrase knowledge storing unit 121.

First, the input accepting unit 101 accepts the input of the source language sentence (step S1001). Here, the user makes a speech of the source language sentence 1301 as shown in FIG. 15, and the input of a speech recognition result of the speech is accepted. The source language analyzing unit 102 analyzes the source language sentence 1301 (step S1003), thereby outputting the morpheme sequence 1302 and the syntactic structure 1303.

Further, the translation unit 103 executes the translation process to output the target language sentence 1304 (step S1004). At this time, the translation result 1305 including information about success or failure of the translation process, and defect occurred in the analysis process is output simultaneously. In this example, it is shown that the translation result 1305 is output representing that the translation is failed and is executed partially, so that only a partial translation is obtained.

By this, the user can confirm that the source language sentence 1301, which is his speech, is not correctly translated into English, as the target language. If the user determines that the translation is not appropriate, the input accepting unit 101 determines that the input of success of the translation is not accepted at step S1006 (step S1006: No), and the paraphrasing process is executed (step S1007).

The paraphrasing process adds the paraphrase knowledge, in which the morpheme sequence Sm and the syntactic structure Sa relative to the source language sentence 1301 satisfy the antecedent part, to the paraphrase knowledge set [P], by referring to the paraphrase knowledge storing unit 121 (step S601).

In this example, the antecedent part of the paraphrase knowledge 1201 in FIG. 14 is satisfied, so that the paraphrase knowledge 1201 is applied to the source language sentence 1301 to generate the source language paraphrase sentence 1306 (step S604). If the translation process of the source language paraphrase sentence 1306 is successful (step S606: Yes), the source language paraphrase sentence 1306 is output (step S608). A translation result 1307 of the source language paraphrase sentence 1306 is also output (step S605).

By being offered the source language paraphrase sentence 1306 as shown in FIG. 15, the user can confirm that the translation will be successful if a word W1308 is added after a word W1307, so that the user can properly improve the re-input sentence. Further, in a case in which the source language paraphrase sentence 1306 can be adopted as the input sentence, the user can perform an operation to designate the source language paraphrase sentence 1306 on the screen, thereby re-inputting the source language sentence, easily.

Suppose that the user determines that the source language paraphrase sentence 1306 does not conforms to the speech intention and re-inputs the source language sentence (step S1009). FIG. 16 is a schematic diagram showing an example of data output at the communication supporting process in this example.

The drawing indicates an example in which the source language sentence 1401 is input as the re-input sentence. In this case, the input accepting unit 101 sets the re-input flag to ON (step S1010), and associates the source language re-input sentence and the ON-state of the re-input flag at the moment of input with each other and stores the same in the input record unit (step S1011). Further, the source language analyzing unit 102 executes the analysis process relative to the re-input sentence (step S1003), thereby outputting the morpheme sequence 1402 and the syntactic structure 1403.

Further, the translation unit 103 executes the translation process, thereby outputting the target language sentence 1404 (step S1004), and the translation result 1405 at the same time. If the user determines that the translation is properly executed and the input accepting unit 101 accepts the input, indicating the success of the translation relative to this output (step S1006: Yes), the output unit 106 speech-synthesizes the target language sentence 1404 and outputs the same (step S1021).

Next, the paraphrase knowledge extracting process is executed. Here, it is assumed that information as shown in FIG. 10 is stored in the input record storing unit 722, with the assumption of the input of an example as described above.

First, the input record is added to the input/re-input set [I] in the order from the newest speech to older one, until the speech with the re-input flag in OFF-state is obtained (step S1102). But in the present embodiment, it is set not to take the one equivalent to the source language input Si, which is the newest input adopted by the user. FIG. 17 is a schematic diagram showing an example of a data structure of thus obtained input/re-input set [I].

As shown in the drawing, the input/re-input set [I] stores one input record. Next, the morpheme sequence Im and the syntactic structure Ia are extracted from the input/re-input set [I] (step S1104) and the paraphrase knowledge is extracted by associating the morpheme sequence Sm and the syntactic structure Sa stored at that moment, that is, held as the output at step S1003 relative to the source language input Si adopted by the user, with the extracted morpheme sequence Im, and the syntactic structure Ia (step S1105). FIG. 18 is a schematic view showing an example of the paraphrase knowledge obtained by the paraphrase knowledge extracting process.

The example shown in the drawing is the paraphrase knowledge extracted by following four steps. First, the syntactic structures Sa and Ia relative to the initial input sentence are associated with each other to obtain the paraphrase knowledge, and the initial priority thereof is set to 5. Thereby, the paraphrase knowledge 1601 in FIG. 18 is obtained. Second, the syntactic structures Sa and Ia are associated with the syntactic structures, in which the corresponding words are parameterized, to obtain the paraphrase knowledge, and the initial priority thereof is set to 3. Therefore, the paraphrase knowledge 1602, 1603, and 1604 are obtained.

Third, the morpheme sequence Sm and the syntactic structure Im are associated with each other to obtain the paraphrase knowledge, and the initial priority thereof is set to 3. Thereby, the paraphrase knowledge 1605 in FIG. 18 is obtained. Fourth, the morpheme sequence Sm and Im are associated with the morpheme sequence, in which the corresponding words are parameterized, to obtain the paraphrase knowledge, and the initial priority thereof is set to 1. Thereby, the paraphrase knowledge 1606, 1607, and 1608 are obtained.

The extracted paraphrase knowledge is registered so as not to be overlapped with the paraphrase knowledge already stored in the paraphrase knowledge storing unit 121. That is to say, the already registered paraphrase knowledge should not be added to the paraphrase knowledge storing unit 121.

In this manner, in the communication supporting apparatus according to second embodiment, the paraphrase knowledge can be extracted by referring to the sentence paraphrased and re-input by the user, and can be registered to storing unit. Therefore, it becomes possible to gradually expand range of paraphrasable speech, thereby obtaining the paraphrase knowledge well adapted to the speech tendency of the user. Further it also becomes possible to reinforce the re-input sentence improving support to the user, thereby further reducing the input process burden of the source language sentence.

The communication supporting apparatus according to a third embodiment is configured to raise the priority of the paraphrase knowledge relative to the source language paraphrase sentence, or to lower the priority of the paraphrase knowledge generating the source language paraphrase sentence which is not adopted, when the user selects the offered source language paraphrase sentence.

Figure 19:
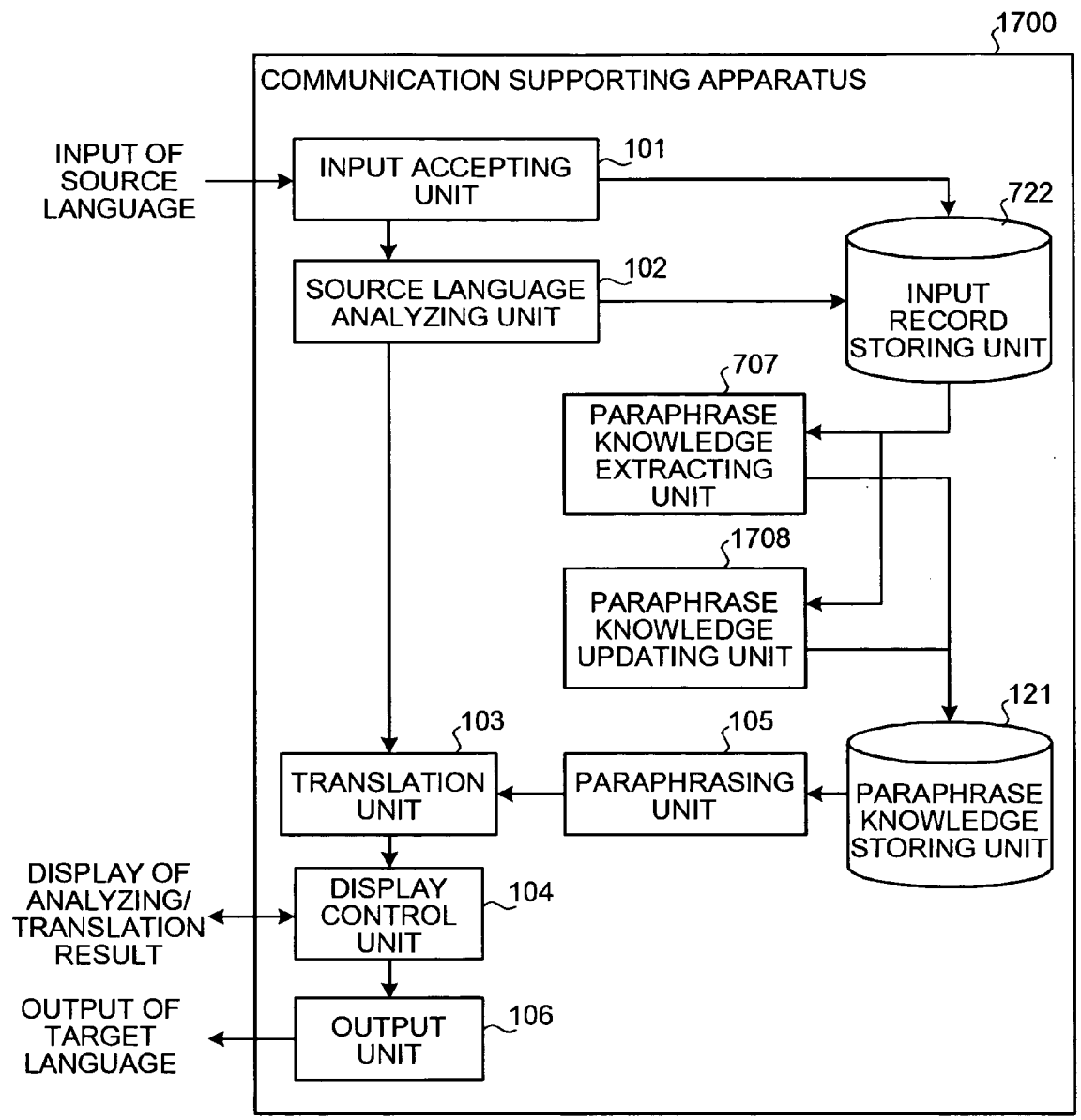
FIG. 19 is a block diagram showing a structure of a communication supporting apparatus according to a third embodiment.

FIG. 19 is a block diagram showing a structure of a communication supporting apparatus 1700 according to the third embodiment. As shown in the drawing, the communication supporting apparatus 1700 is provided with the input accepting unit 101, the source language analyzing unit 102, the translation unit 103, the display control unit 104, the paraphrasing unit 105, the output unit 106, the paraphrase knowledge extracting unit 707, a paraphrase knowledge updating unit 1708, the paraphrase knowledge storing unit 121, and the input record storing unit 722.

The third embodiment is similar to the second embodiment except that the paraphrase knowledge updating unit 1708 is added. Other structure and function of the third embodiment are the same as those of the communication supporting apparatus 700 according to the second embodiment shown in the block diagram in FIG. 9, so that the same reference numerals are attributed, and the explanation thereof is not repeated.

The paraphrase knowledge updating unit 1708 is configured to raise the priority of the paraphrase knowledge corresponding to the source language paraphrase sentence, or to lower the priority of the paraphrase knowledge generating the source language paraphrase sentence, which is not adopted, when the user selects the offered source language paraphrase sentence. Specifically, the paraphrase knowledge updating unit 1708 raises the priority of the paraphrase knowledge realizing the paraphrase of the source language paraphrase sentence when the source language paraphrase sentence offered at the paraphrase unit is adopted by the user, or the content as same as that is spoken, and the priority of the paraphrase knowledge capable of realizing the similar paraphrasing process in the paraphrase knowledge storing unit 121. Further, in a case in which the user makes a speech which is different from the source language paraphrase sentence, the paraphrase knowledge updating unit 1708 executes the process for lowering the priority of the paraphrase knowledge realizing the paraphrase, and of the paraphrase knowledge realizing the similar paraphrasing process in the paraphrase knowledge storing unit 121.

Also, the paraphrase knowledge updating unit 1708 may be configured to raise the priority of the paraphrase knowledge capable of generating the input speech, when the translation process is normally executed at the initial input without being paraphrased by the user. By the process as described above, the priority of adopting the paraphrase knowledge at the moment of generating the source language paraphrase sentence can be dynamically changed. Further thereby, it becomes possible that the paraphrase knowledge well adapted to the user has a priority to avoid the application of the paraphrase knowledge, which is not preferred by the user.

Figure 20A:
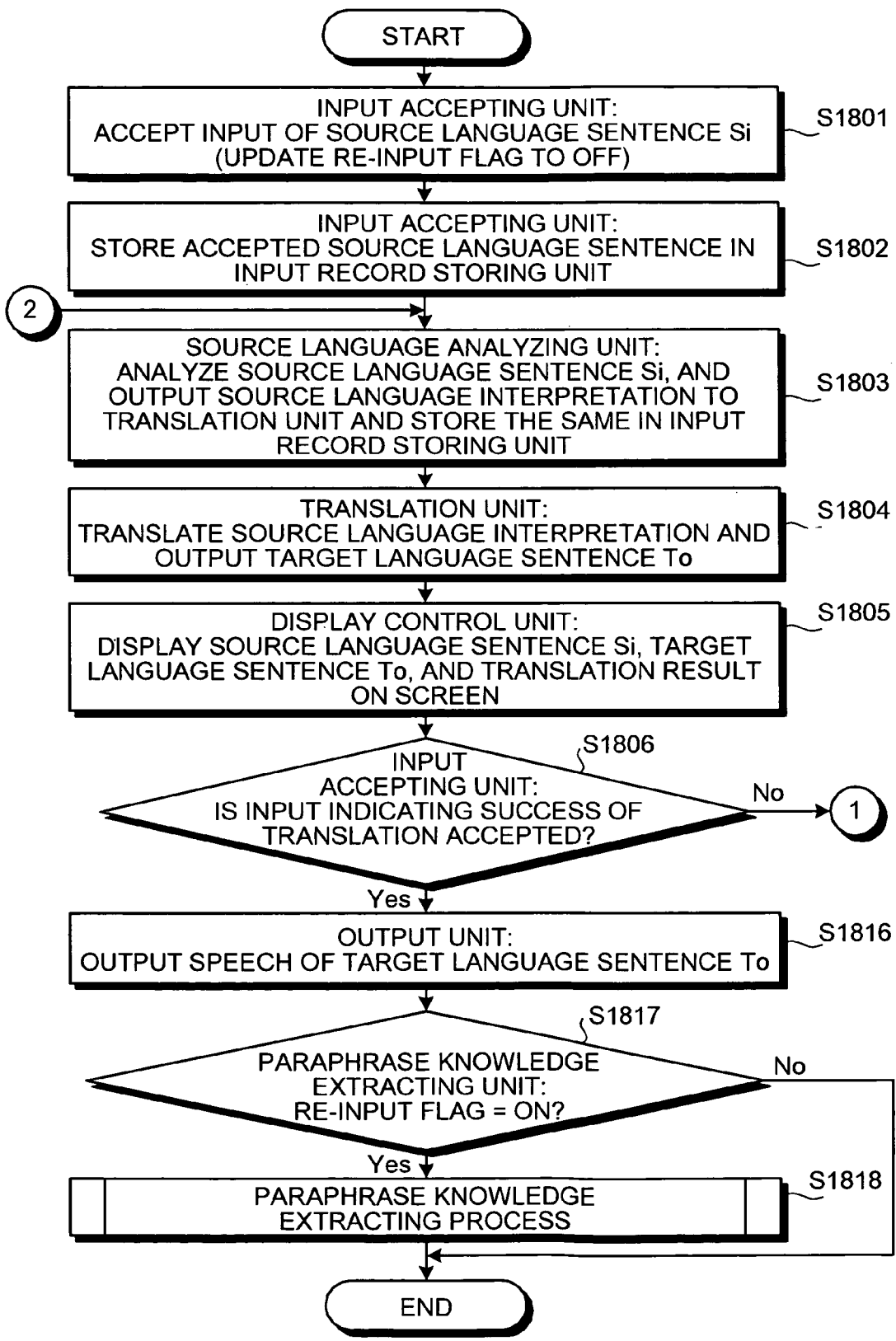
FIGS. 20A and 20B show a flowchart of a communication supporting process in the third embodiment.
Figure 20B:
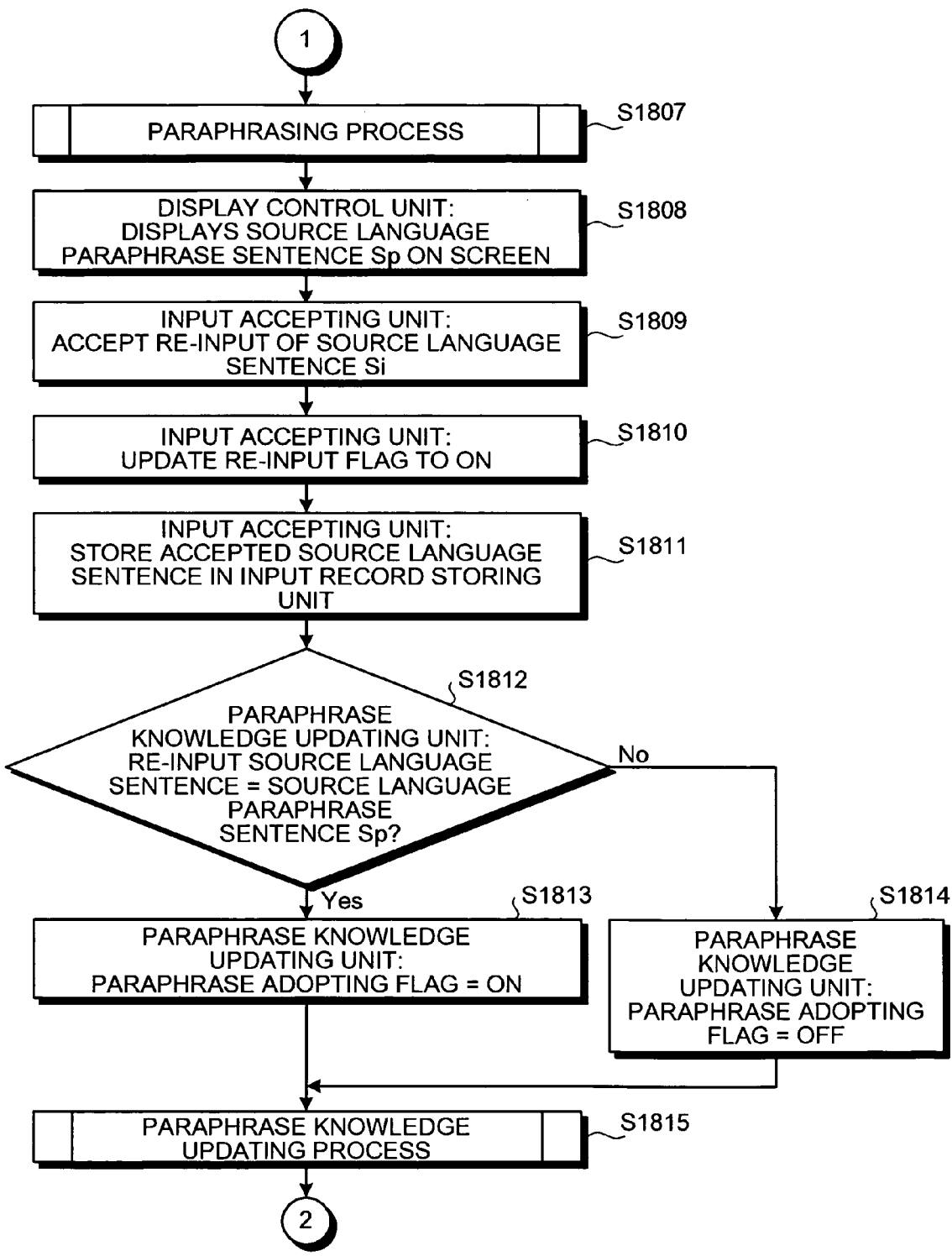

Next, the communication supporting process of thus structured communication supporting apparatus 1700 according to the third embodiment is described. FIGS. 20A and 20B show a flowchart of the communication supporting process in the third embodiment.

The input acceptance process, the source language analysis process, the translation process, the paraphrasing process, the screen displaying process, and the re-input acceptance process from step S1801 to step S1811 are similar to those from step S1001 to step S1011 of the communication supporting apparatus 700 according to the second embodiment, so that they are not explained. Further, the speech output process and the paraphrase knowledge extracting process from step S1816 to step S1818 are similar to those from step S1012 to step S1014 of the communication supporting apparatus 700 according to the second embodiment, so that they are not explained.

The third embodiment is different from the second embodiment in that the process to update the priority of the paraphrase knowledge by referring to the re-input sentence is added, at steps S1812 to S1815. The process will be described in detail below.

First, after the input accepting unit 101 updates the re-input flag to ON at step S1811, the paraphrase knowledge updating unit 1708 determines whether or not the re-input source language sentence (re-input sentence) is the same as the source language paraphrase sentence generated by the paraphrasing process (step S1812).

If the re-input sentence is the same as the source language paraphrase sentence (step S1812: Yes), the paraphrase knowledge updating unit 1708 sets the paraphrase adopting flag to ON (step S1813). If the re-input sentence is not the same as the source language paraphrase sentence (step S1812: No), the paraphrase knowledge updating unit 1708 sets the paraphrase adopting flag to OFF (step S1814).

After that, the paraphrase knowledge updating unit 1708 executes the paraphrase knowledge updating process (step S1815), and the operation returns to the analysis process of the source language sentence by the source language analyzing unit 102 and repeats the process (step S1803). The detailed paraphrase knowledge updating process at step S1815 will be described below.

Figure 21:
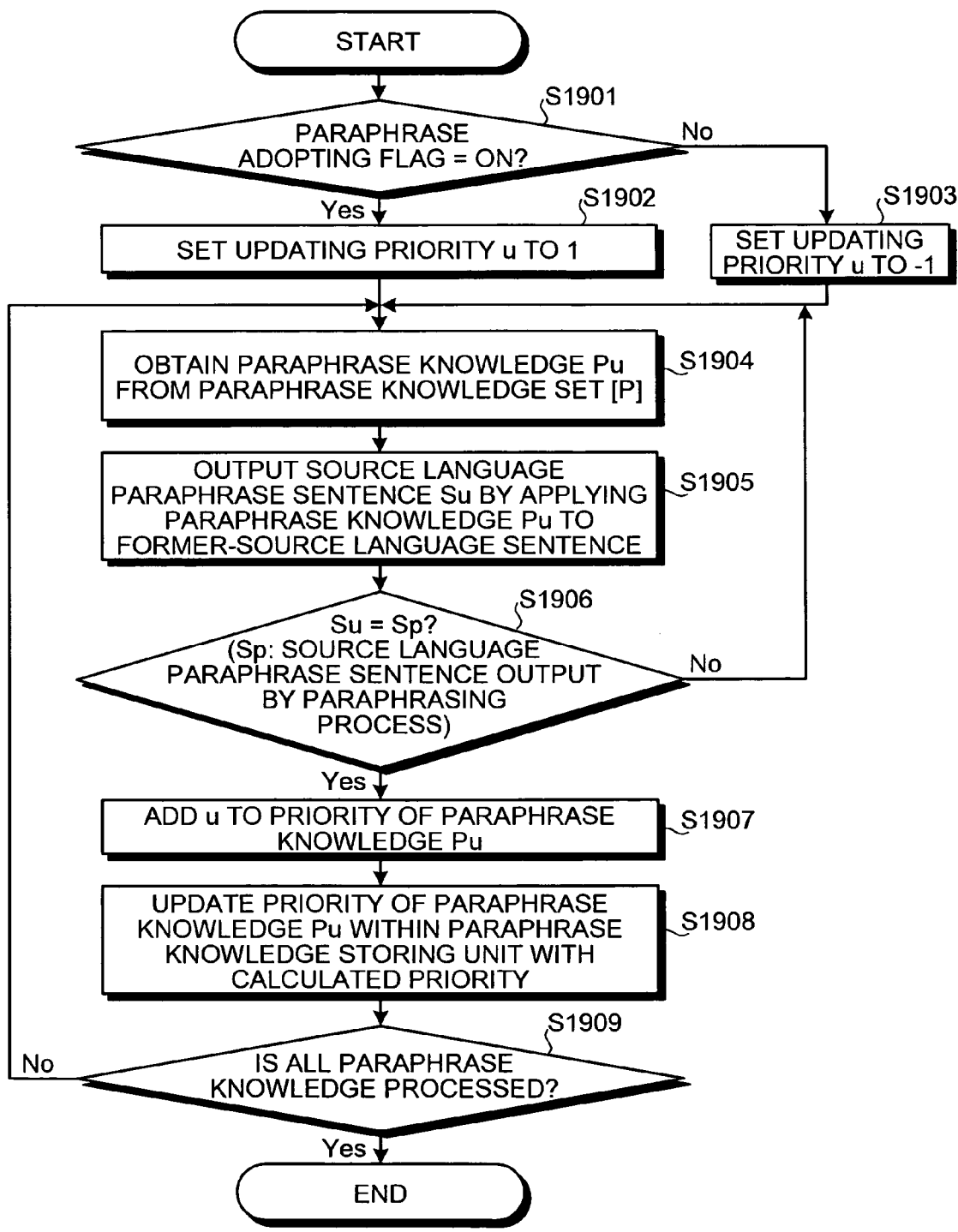
FIG. 21 is a flowchart of a paraphrase knowledge updating process in the third embodiment.

FIG. 21 is a flowchart showing an entire flow of the paraphrase knowledge updating process of the third embodiment. First, the paraphrase knowledge updating unit 1708 determines whether or not the paraphrase adopting flag is set to ON (step S1901). If the paraphrase adopting flag is set to ON (step S1901: Yes), the paraphrase knowledge updating unit 1708 sets updating priority (hereinafter, referred to as u), to 1 (step S1902). If the paraphrase adopting flog is set to OFF (step S1901: No), the paraphrase knowledge updating unit 1708 sets the updating priority (hereinafter, referred to as u) to −1 (step S1903). The updating priority herewith set is not necessarily set to the same value and may be dynamically changed based on the suitability.

Next, the paraphrase knowledge updating unit 1708 obtains one paraphrase knowledge (hereinafter, referred to as Pu) from the paraphrase knowledge set [P] obtained at step S601 (step S1904). Subsequently, the paraphrase knowledge updating unit 1708 applies the obtained paraphrase knowledge Pu relative to a former source language sentence, thereby outputting the corresponding source language paraphrase sentence (hereinafter, referred to as Su) (step S1905).

Herein, the former source language sentence unit not the source language sentence Si re-input by the user just before at step S1809 before that, but the source language sentence input at step S1801 or step S1809. It is because, in order to lower the priority of the paraphrase knowledge outputting the source language paraphrase sentence same as the source language paraphrase sentence which is not adopted by the user, it is required to determine by applying the paraphrase knowledge relative to the former source language, which is a source language corresponding to the source language paraphrase sentence which is not adopted by the user. If the user adopts the source language paraphrase sentence, the former source language sentence conforms to the source language sentence Si re-input by the user just before that.

Next, the paraphrase knowledge updating unit 1708 determines whether or not the source language paraphrase sentence Sp used at the paraphrasing process conforms to the source language paraphrase sentence Su output at step S1905 (step S1906). If the sentence Sp does not conform to the sentence Su (step S1906: No), the operation returns to the process to obtain next paraphrase knowledge and repeats the process, without updating the priority (step S1904).

If the sentence Sp conforms to the sentence Su (step S1906: Yes), the paraphrase knowledge updating unit 1708 adds the updating priority u to the priority of the paraphrase knowledge Pu (step S1907). Next, the paraphrase knowledge updating unit 1708 updates the priority of the paraphrase knowledge Pu stored in the paraphrase knowledge storing unit 121 by means of the calculated priority (step S1908).

By doing so, it becomes possible to update not only the paraphrase knowledge corresponding to the source language paraphrase sentence adopted by the user but also the priority of the paraphrase knowledge capable of outputting the source language paraphrase sentence same as the paraphrase knowledge.

Next, the paraphrase knowledge updating unit 1708 determines whether or not all of the paraphrase knowledge in the paraphrase knowledge set [P] are processed (step S1909). If not all the paraphrase knowledge are processed (step S1909: No), the paraphrase knowledge updating unit 1708 obtains the next paraphrase knowledge and repeats the process (step S1904). If all the paraphrase knowledge are processed (step S1909: Yes), the paraphrase knowledge updating process is ended.

Now, a specific example of the communication supporting process in the third embodiment is described. Herein, it is assumed that the paraphrase knowledge as shown in FIG. 14 is registered to the paraphrase knowledge storing unit 121, as in the specific example in the second embodiment.

As the specific example shown in the second embodiment, suppose that the source language paraphrase sentence 1306 as shown in FIG. 15 is offered to the user, and the user determines that the source language paraphrase sentence 1306 does not conform to the speech intention, and re-inputs the source language sentence 1401 as shown in FIG. 16 (step S1809).

In this case, the paraphrase knowledge updating unit 1708 determines that the re-input source language sentence is not the same as the source language paraphrase sentence generated by the paraphrasing process (step S1812: No), and the paraphrase adopting flag is set to OFF (step S1814), and the paraphrase knowledge updating process is executed (step S1815).

Since the paraphrase adopting flag is set to OFF, at a paraphrase knowledge updating process, the updating priority u is set to a value "−1" (step S1903). FIG. 22 is a schematic diagram showing an example of the paraphrase knowledge set [P] at this moment. As shown in the drawing, the paraphrase knowledge set [P] contains only one element; therefore, this obtains the paraphrase knowledge 2001 shown in FIG. 22 as the paraphrase knowledge Pu (step S1904).

Since the paraphrase knowledge Pu is the same as the paraphrase knowledge used at the paraphrasing process, this conforms to the source language paraphrase sentence Su output by applying the paraphrase knowledge Pu and the source language paraphrase sentence Sp output at the paraphrasing process (step S1906: Yes).

Therefore, the value u (=−1) is added to the priority of the paraphrase knowledge Pu (step S1907), and the priority of the corresponding paraphrase knowledge in the paraphrase knowledge storing unit 121 is updated (step S1908). Since the update priority is in the negative value, these operations are meant to lower the priority.

FIG. 23 is a schematic diagram showing an example of the paraphrase knowledge storing unit 121 after updating by the above-described process. As shown in the drawing, as compared to the paraphrase knowledge 1201 in FIG. 14 indicating the paraphrase knowledge storing unit 121 before updating, the priority of the corresponding paraphrase knowledge 2101 is updated. On the other hand, the paraphrase knowledge 2102 which is not referred to in the paraphrasing process in the above-described example is not updated.

Next, another example on assumption that the paraphrase knowledge as shown in FIG. 24 is registered to the paraphrase knowledge storing unit 121, and the input record as shown in FIG. 10 is stored in the input record storing unit 722 is described. FIG. 24 is a schematic diagram showing an example of data stored in the paraphrase knowledge storing unit 121, in this example. Further, FIG. 25 is a schematic diagram showing an example of data output at the communication supporting process in this example.

First, the input accepting unit 101 accepts the input of the source language sentence (step S1801). Here, it is supposed the input of the source language sentence 2301 as shown in FIG. 25 are accepted. The source language analyzing unit 102 analyzes the source language sentence 2301 (step S1803), thereby outputting a morpheme sequence 2302 and a syntactic structure 2303.

Further, the translation unit 103 executes the translation process to output a target language sentence 2304 (step S1804). At this time, the translation result 2305 indicating success or failure of the translation process is output simultaneously. In this example, it is shown that the translation result 2305 is output indicating that the translation is failed and is partially executed, so that only a partial translation is generated.

By this, the user can confirm that the source language sentence 1301, which is his speech, is not correctly translated into English, as the target language, and determine that the translation is inappropriate. After that, the input accepting unit 101 determines that the input indicating that the translation is successful is not accepted at step S1806 (step S1806: No), and executes the paraphrasing process (step S1807).

At the paraphrasing process, the morpheme sequence Sm and the syntactic structure Sa corresponding to the source language sentence 2301 add the paraphrase knowledge satisfying the antecedent part, by referring to the paraphrase knowledge storing unit 121 to the paraphrase knowledge set [P] (step S601). FIG. 26 is a schematic diagram showing an example of the paraphrase knowledge set [P] thus extracted.

Suppose that the paraphrase knowledge 2401 is obtained from the paraphrase knowledge included in the paraphrase knowledge set [P] as shown in FIG. 26, as the paraphrase knowledge Px having the highest suitability (step S603).

A source language paraphrase sentence 2306 as shown in FIG. 25 is generated by applying the obtained paraphrase knowledge Px to the source language sentence, (step S604).

If the translation process by the source language paraphrase sentence 2306 is failed (step S606: No), the generating process of the source language paraphrase sentence is executed by referring to the applicable paraphrase knowledge Px from the paraphrase knowledge set [P] in sequence, and the process is repeated until the translation is successful (step S606: Yes) or the applicable paraphrase knowledge does not exist (step S609). Herein, it is assumed that the translation process is successful.

Next, if the user selects to adopt the source language paraphrase sentence 2306 as the source language sentence, or if the user speaks the source language sentence same as the source language paraphrase sentence 2306, and inputs the speech, the input of the source language paraphrase sentence 2306 is accepted as the source language sentence (step S1809).

In this case, the re-input source language sentence conforms to the source language paraphrase sentence 2306 (step S1812: Yes), so that the paraphrase adopting flag is set to ON (step S1813), and the paraphrase knowledge updating process is executed (step S1815).

At the paraphrase knowledge updating process, since the paraphrase adopting flag is set to ON (step S1901: Yes), the paraphrase knowledge updating unit 1708 sets the updating priority u to 1 (step S1902).

Further since the paraphrase knowledge set [P] includes a plurality of elements, the paraphrase knowledge updating unit 1708 applies the sequentially obtained paraphrase knowledge Pu to the source language sentence, thereby updating the priority of the paraphrase knowledge, in which the output source language paraphrase sentence Su conforms to the source language paraphrase sentence 2306 (steps from S1904 to S1909). In this example, the updating priority is set to a positive value, so that this means to raise the priority.

FIG. 27 is a schematic diagram showing an example of the paraphrase knowledge storing unit 121 after updating by the above-described process. The priority of the paraphrase knowledge 2501, 2502, 2503, and 2504 is updated as compared with those in the paraphrase knowledge storing unit 121 before updating as shown in FIG. 24.

After the paraphrase knowledge updating process, the process is repeated by means of the re-input source language sentence as a new source language sentence. FIG. 28 is a schematic diagram showing an example of data output at the communication supporting apparatus.

The source language analyzing unit 102 analyzes the re-input source language sentence 2601 as shown in the drawing (step S1803), thereby outputting a morpheme sequence 2602 and a syntactic structure 2603.

Further, the translation unit 103 executes the translation process to output a target language sentence 2604 (step S1804). In this moment, a translation result 2605 indicating whether or not the translation process is successful is simultaneously output. In this example, it is shown that the translation result indicating that the translation is successful is output.

By this, the user can confirm that the source language sentence 1301, which is his speech, is correctly translated into English, as the target language. After that, the input accepting unit 101 accepts the input indicating that the translation is successful at step S1806 (step S1806: Yes), then the speech output process of the target language sentence To is executed by the output unit 106 (step S1816). Next, the paraphrase knowledge extracting process is performed, but since the speech is not modified by the re-input in this example, new paraphrase knowledge is not extracted (step S1818).

As described above, in the communication supporting apparatus according to the third embodiment, it becomes possible to apply more proper paraphrase knowledge with priority by storing the paraphrase knowledge and the priority representing the order of priority in applying the paraphrase knowledge, which are associated with each other, and raising the priority of the paraphrase knowledge corresponding to the source language paraphrase sentence, or lowering the priority of the paraphrase knowledge generating the source language paraphrase sentence not adopted, when the user selects the offered source language paraphrase sentence. So, the paraphrase offering well adapted to the speech tendency of the user becomes possible.

The communication supporting programs executed at the communication supporting apparatuses according to first to third embodiments may be offered pre-incorporated in a ROM (Read Only Memory) or the like and offered.

The communication supporting programs executed at the communication supporting apparatuses according to the first to third embodiments may be configured to store in a recording media such as a CD-R (Compact Disk Read Only Memory), a flexible disk (FD), a CD-R (Compact Disk Recordable), a DVD (Digital Versatile Disk), and the like, capable of being read by the computer, as a file in the form of being installed or executed and offered.

Furthermore, the communication supporting programs executed at the communication supporting apparatuses according to the first to third embodiments may be configured to be offered by being stored in the computer connected to a network such as the Internet, and downloaded via the network. Further the communication supporting programs executed at the communication supporting apparatuses according to the first to third embodiments may be offered or distributed via the network such as the Internet.

Each of the communication supporting programs executed at the communication supporting apparatuses according to the first to third embodiments has a module structure including the above-described units (the input accepting unit, the source language analyzing unit, the translation unit, the display control unit, the paraphrasing unit, the output unit, the paraphrase knowledge extracting unit, and the paraphrase knowledge updating unit). Further as an actual hardware, the CPU (Central Processing Unit) reads the communication supporting program from the above-described recording media and executes the same, then the above-described units are loaded on a main memory device, thereby generating the units on the main memory device.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A communication supporting apparatus comprising:
an input accepting unit that accepts a source language sentence to be translated input by a user;
a paraphrase knowledge storing unit that stores paraphrase knowledge in which a source language interpretation which is an interpretation of the semantic content of the source language sentence is associated with a paraphrase interpretation having the same semantic content as the source language interpretation and a different expression form;
a source language analyzing unit that analyzes the semantic content of the input source language sentence and outputs the source language interpretation;
a paraphrasing unit that obtains the paraphrase interpretation associated with the output source language interpretation from the paraphrase knowledge storing unit, and paraphrases the input source language sentence in a source language paraphrase sentence based on the obtained paraphrase interpretation; and
a translation unit that translates the output source language interpretation into a first target language sentence and translates the obtained paraphrase interpretation into a second target language sentence.

2. The communication supporting apparatus according to claim 1, wherein
the input accepting unit accepts one source language re-input sentence selected by the user, wherein the re-input sentence is a paraphrased sentence of the source language sentence input by the user, and
the communication supporting apparatus further comprises:
an input record storing unit that stores the source language interpretation relative to the source language sentence input by a user, and a re-input interpretation which is the source language interpretation relative to the re-input sentence, by associating the source language interpretation with the re-input interpretation; and
a paraphrase knowledge extracting unit that extracts the paraphrase knowledge from the input record storing unit, by associating a select interpretation which is the re-input interpretation relative to the re-input sentence accepting selection by the user with the source language interpretation relative to the source language sentence or the re-input interpretation other than the select interpretation, thereby registering to the paraphrase knowledge storing unit.

3. The communication supporting apparatus according to claim 1, wherein
the paraphrase knowledge storing unit stores a priority representing an order of priority in applying the paraphrase knowledge by associating the priority . with the paraphrase knowledge, and
the communication supporting apparatus further comprises a paraphrase knowledge updating unit that changes the priority based on an adopting state of the paraphrase knowledge.

4. The communication supporting apparatus according to claim 3, wherein the paraphrase knowledge updating unit makes the priority of the paraphrase knowledge generating the source language paraphrase sentence different from the re-input sentence selected by the user lower than the priority before selection, and makes the priority of the paraphrase knowledge generating the source language paraphrase sentence identical to the re-input sentence selected by the user higher than the priority before the selection.

5. The communication supporting apparatus according to claim 3, wherein the paraphrasing unit obtains, from the paraphrase knowledge storing unit, a paraphrase interpretation associated with paraphrase knowledge with the highest priority when there is a plurality of paraphrase interpretations associated with the output source language interpretation, and paraphrases the input source language sentence in a source language paraphrase sentence based on the obtained paraphrase interpretation.

6. The communication supporting apparatus according to claim 3, wherein the paraphrasing unit obtains, from the paraphrase knowledge storing unit, paraphrase interpretations associated with a predetermined number of paraphrase knowledge in descending order of priority when there is a plurality of paraphrase interpretations associated with the output source language interpretation, and paraphrases the input source language sentence in a source language paraphrase sentence based on the obtained paraphrase interpretations.

7. The communication supporting apparatus according to claim 1, wherein
the paraphrase knowledge storing unit stores paraphrase knowledge in which a morpheme sequence which is a result of a morphological analysis of the source language sentence to be translated is associated with a paraphrase morpheme sequence having semantic content identical to the semantic content represented by the morpheme sequence and a different expression form,
the source language analyzing unit outputs the morpheme sequence, which is a result of the morphological analysis of the input source language sentence as the source language interpretation,
the paraphrasing unit obtains the paraphrase morpheme sequence associated with the morpheme sequence from the paraphrase knowledge storing unit, and paraphrases the input source language sentence in a source language paraphrase sentence based on the obtained paraphrase morpheme sequence, and the translation unit translates the output morpheme sequence into the first target language sentence and translates the obtained paraphrase morpheme sequence into the second target language sentence.

8. The communication supporting apparatus according to claim 1, wherein the paraphrase knowledge storing unit stores the paraphrase knowledge in which a syntactic structure which is a result of syntactic analysis of the source language sentence to be translated is associated with a paraphrase syntactic structure having semantic content identical to the semantic content represented by the syntactic structure a different expression form, the source language analyzing unit outputs the syntactic structure which is a result of the syntactic analysis of the input source language sentence, as the source language interpretation, the paraphrasing unit obtains the paraphrase syntactic structure associated with the syntactic structure from the paraphrase knowledge storing unit, and paraphrases the input source language sentence in a source language paraphrase sentence based on the obtained paraphrase syntactic structure, and the translation unit translates the output syntactic structure line into the first target language sentence and translates the obtained paraphrase syntactic structure into the second target language sentence.

9. A communication supporting method comprising:

accepting a source language sentence to be translated, input by a user;

analyzing the semantic content of the input source language sentence;

outputting a source language interpretation;

obtaining a paraphrase interpretation associated with the output source language interpretation from a paraphrase knowledge storing unit which stores the source language interpretation and the paraphrase interpretation having the same semantic content as the source language interpretation and a different expression form in association with each other;

paraphrasing the input source language sentence in a source language paraphrase sentence based on the obtained paraphrase interpretation; and translating the output source language interpretation into a first target language sentence and the obtained paraphrase interpretation into a second target language sentence.

10. A computer program product having a non-transitory computer readable medium including programmed instructions for performing a communication support processing, wherein the instructions, when executed by a computer, cause the computer to perform:

accepting a source language sentence to be translated, input by a user;

analyzing the semantic content of the input source language sentence;

outputting a source language interpretation;

obtaining a paraphrase interpretation associated with the output source language interpretation from a paraphrase knowledge storing unit which stores the source language interpretation and the paraphrase interpretation having the same semantic content as the source language interpretation and a different expression form in association with each other;

paraphrasing the input source language sentence in a source language paraphrase sentence based on the obtained paraphrase interpretation; and translating the output source language interpretation into a first target language sentence and the obtained paraphrase interpretation into a second target language sentence.

* * * * *

UNITED STATES PATENT AND TRADEMARK OFFICE
CERTIFICATE OF CORRECTION

PATENT NO. : 7,904,291 B2
APPLICATION NO. : 11/370105
DATED : March 8, 2011
INVENTOR(S) : Kamatani et al.

It is certified that error appears in the above-identified patent and that said Letters Patent is hereby corrected as shown below:

Claim 3, column 22, line 19, change "priority . with" to --priority with--.

Signed and Sealed this
Seventh Day of June, 2011

David J. Kappos
*Director of the United States Patent and Trademark Office*